United States Patent
Berke et al.

(10) Patent No.: US 8,277,556 B2
(45) Date of Patent: Oct. 2, 2012

(54) ARTICLES MADE FROM CEMENTITIOUS FOAM AND SLURRY

(75) Inventors: Neal S. Berke, Chelmsford, MA (US); Jordan S. Merritt, Lynn, MA (US); Lianfang Li, Shrewsbury, MA (US); Antonio J. Aldykiewicz, Jr., Lexington, MA (US); Robert A. Wiercinski, Lincoln, MA (US); Michael D. Morgan, Billerica, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 544 days.

(21) Appl. No.: 12/478,872

(22) Filed: Jun. 5, 2009

(65) Prior Publication Data
US 2010/0310846 A1 Dec. 9, 2010

(51) Int. Cl.
C04B 24/00 (2006.01)
C04B 24/04 (2006.01)

(52) U.S. Cl. ........ 106/644; 106/724; 106/727; 106/728; 106/730; 106/823

(58) Field of Classification Search .................. 106/724, 106/644, 727, 728, 730, 823
See application file for complete search history.

(56) References Cited

U.S. PATENT DOCUMENTS

| | | | |
|---|---|---|---|
| 2,432,971 A | 12/1947 | Ruthman | |
| 3,062,669 A | 11/1962 | Dilnot | |
| 3,663,251 A | 5/1972 | Moren et al. | |
| 3,758,319 A | 9/1973 | Ergene | |
| 3,867,159 A | 2/1975 | Ergene | |
| 3,963,507 A | 6/1976 | Kuramoto et al. | |
| 3,989,534 A | 11/1976 | Plunguian et al. | |
| 4,077,809 A | 3/1978 | Plunguian et al. | |
| 4,547,223 A | 10/1985 | Goto et al. | |
| 4,731,389 A | 3/1988 | Christopher et al. | |
| 5,109,030 A | 4/1992 | Chao et al. | |
| 5,110,839 A | 5/1992 | Chao | |
| 5,147,820 A | 9/1992 | Chittipeddi et al. | |
| 5,399,195 A | 3/1995 | Hansen et al. | |
| 5,413,634 A | 5/1995 | Shawl et al. | |

(Continued)

FOREIGN PATENT DOCUMENTS
WO 03/060018 A2 7/2003

OTHER PUBLICATIONS

TAMOL™ 960/TAMOL 731A, Rohm and Haas, Aug. 1999, 4 pages.

(Continued)

*Primary Examiner* — Paul Marcantoni
(74) *Attorney, Agent, or Firm* — Craig K. Leon; Stephan P. Williams

(57) ABSTRACT

Lightweight cementitious foams of the invention have excellent dynamic and dimensional stability due to use of foaming system comprising polycarboxylate surfactant foam generating agent, foam stabilizer (e.g., PVOH), and shrinkage reducing admixture to inhibit plastic shrinkage and micro-cracking of cement. The foaming system can be used in conventional cement mortars or concretes as well as with exemplary cementitious slurry systems of the invention, which include an expansive agent, a cross-linking agent for the foam stabilizer. Microfibers can be used in the foam, slurry, or both, to prevent micro-cracking. Cementitious foams can be made without use of autoclave or lightweight aggregates to achieve enhanced compressive strength and thermal insulation properties that compare favorably with conventional foams and insulation materials at comparable densities.

19 Claims, 14 Drawing Sheets

U.S. PATENT DOCUMENTS

| | | | |
|---|---|---|---|
| 5,556,460 | A | 9/1996 | Berke et al. |
| 5,571,319 | A | 11/1996 | Berke et al. |
| 5,603,760 | A | 2/1997 | Berke et al. |
| 5,604,273 | A | 2/1997 | Kerkar et al. |
| 5,618,344 | A | 4/1997 | Kerkar et al. |
| 5,622,558 | A | 4/1997 | Berke et al. |
| 5,626,663 | A | 5/1997 | Berke et al. |
| 5,641,584 | A | 6/1997 | Andersen et al. |
| 5,654,048 | A | 8/1997 | Andersen et al. |
| 5,753,368 | A | 5/1998 | Berke et al. |
| 5,779,788 | A | 7/1998 | Berke et al. |
| 5,938,835 | A | 8/1999 | Shawl et al. |
| 6,277,191 | B1 | 8/2001 | Budiansky et al. |
| 6,547,871 | B2 | 4/2003 | Chatterji et al. |
| 6,780,230 | B2 | 8/2004 | Hilton et al. |
| 6,797,054 | B2 | 9/2004 | Chatterji et al. |
| 2004/0092614 | A1 | 5/2004 | Hilton et al. |
| 2007/0125011 | A1 | 6/2007 | Weir et al. |
| 2009/0197991 | A1* | 8/2009 | Bury et al. ............... 524/2 |

OTHER PUBLICATIONS

"Foamed Lightweight Concrete", Allied Foam Tech Corporation, http://www.alliedfoamtech.com/appconc.htm, Feb. 12, 2009, 13 pages.

"LITEBULT® Lightweight Aerated Concrete Products", Pan Pacific Group of Companies, http://www.litebuilt.com/techinfo.html, Feb. 12, 2009, 13 pages.

Form PCT/ISA/210, International Search Report for International Application No. PCT/US2009/047985, dated Aug. 3, 2009, 3 pages.

Form PCT/ISA/237, Written Opinion of the International Searching Authority for International Application No. PCT/US2009/047985, dated Aug. 3, 2009, 9 pages.

* cited by examiner

ARTICLES MADE FROM CEMENTITIOUS FOAM AND SLURRY

FIELD OF THE INVENTION

The present invention relates to light weight cement, and more particularly to cementitious foam slurries, methods for making cementitious foam slurries, and cementitious foam materials and articles made from these.

BACKGROUND OF THE INVENTION

Foamed cementitious materials are desirable as building and construction materials because of their light weight and conformability.

In U.S. Pat. No. 2,432,971, Ruthman et al. taught the use of a methyl cellulose gel-like solution, activatible by heating, for preventing structural collapse or migration of components in foams whose constituents were initially water-soluble or water-dispersible. Such constituents include foaming materials except those which render the methyl cellulose ineffective. Suitable foaming agents include saponin containing materials, such as soap bark, soap weed, yucca root, pure saponin, etc. Foaming materials considered unsuitable include sodium and potassium salts of fatty acids (see e.g., column 6, lines 1-17). A number of fiber materials can be mixed into the foam, including cellulose fibers in the form of dried ground paper.

In U.S. Pat. No. 3,867,159, Dilnot disclosed the use of aqueous slurries, comprising finely ground calcareous and siliceous materials, and pre-soaked cellulose fibers to generate light weight materials. The foam is formed in advance of its mixture with the aqueous slurry, so that the bubbles do not substantially coalesce or break down when subsequently mixed into the slurry. Heating the foamed slurry by autoclave produces a rigid matrix having macroscopic spherical voids.

In U.S. Pat. No. 3,758,319 and No. 3,867,159, Ergene disclosed cellular structures made by admixing water and cement under conditions sufficient to produce a high degree of hydration of the cement, followed by introducing foam that has been formed under pressure using water, air, foaming agent (e.g., saponin, peptone, albumin, soap bark, water-soluble cellulose ester), and a chloride accelerator. The foam mixture and cement mixture are blended to a substantially homogeneous, foamed cement slurry, which is cast into a mold and cured (e.g., environmental steam or autoclave) to form a lightweight cellular concrete structure.

In U.S. Pat. No. 3,963,507, Kuramoto et al. disclosed a porous construction material comprising a hydraulic material such as cement and a foaming agent comprising a water-soluble low-viscosity cellulose ether (e.g., 25-2000 centipoise), a water-soluble high-viscosity cellulose derivative (e.g., exceeding 2000 centipoise), and a PVOH foaming accelerator which was at least 75%, and more preferably at least 85%, saponified.

In U.S. Pat. No. 3,989,534, Plunguian disclosed cementitious materials comprising lightweight filler such as perlite, vermiculite, or hollow silicate spheres in combination with a surface active foaming agent and water-soluble organic film forming agents such as guar gum, pregelatinized starch, xanthan gum, and the like, which function as foam stabilizers. In U.S. Pat. No. 4,077,809, Plunguian explained a method wherein the cement and light weight fillers and film forming agents could be combined with pre-formed foams to create a foamed cementitious material useful for soundproofing and thermal insulation.

In U.S. Pat. No. 4,731,389, Christopher et al. (Aircrete) disclosed methods for making foams suitable for insulating cavities and structures. One example involved injecting air into an aqueous solution of PVOH and a dispersant, and then adding the resultant foam to an aqueous solution or suspension of magnesium oxide and barium metaborate and a dispersant. An objective of the inventors was to provide a foam-cement mixture wherein the foam maintained sufficient integrity to maintain its shape and volume until the intermixed cement hardened to fix the composition in place (col. 1, II. 37-42); and this was accomplished by mixing PVOH (polyvinyl alcohol) from the first component with barium metaborate in the second component to initiate and to accelerate the setting of the foam, while providing integrity for supporting the cement as it hardened in place (See col. 3, II. 37; See also col. 4, II. 12-20).

In U.S. Pat. No. 5,110,839, Chao disclosed a foamed composition comprising (a) about 100 parts by weight of a hydraulic substance such as Portland cement, gypsum, or Plaster of Paris; and (b) about 25 to less than about 70 parts by weight water and about 0.01 to about 10 parts by weight of a polymeric foam stabilizer having a weight average molecular weight of from about 1,000 to about 20,000 and comprising a $C_1$-$C_{12}$ alkyl carboxylic acid polymer. This composition could be formed by mixing a homogeneously foamed mixture of water and polymeric stabilizer, and homogeneous slurry comprising cement and polymeric foam stabilizer.

In U.S. Pat. No. 5,641,584, Anderson et al. disclosed insulation barrier materials having cement paste in combination with a rheology modifying agent (e.g., methylhydroxyethylcellulose) and a lightweight aggregate (e.g., perlite, vermiculite, hollow glass spheres, etc.) to lower the density of the insulation barrier and increase its insulation ability. A preferred method for making the insulation barrier materials includes the steps of (1) mixing a powdered hydraulic cement and water to form a cement paste; (2) combining a rheology-modifying agent (methylhydroxyethylcellulose) with cement paste such that the resultant cementitious mixture develops a more plastic rheology; (3) adding an aggregate material and/or entrained air to the cementitious mixture to impart desired lightweight properties; (4) adding a fibrous material (such as abaca, glass, plastic, or metal fiber) preferably having a high aspect (length to width) ratio to the cementitious mixture in order to increase toughness and strength; (5) molding the mixture into an insulation barrier of a predetermined shape; and (6) allowing the cementitious mixture to harden into the predetermined shape. It was desired to obtain insulation barriers that were "form stable" in less than ten minutes.

In U.S. Pat. No. 6,547,871 and No. 6,797,054, Chatterji et al. disclosed foamed well cement slurries which were comprised of hydraulic cement, sufficient water to form pumpable slurry, sufficient gas to generate foam, and hydrolyzed keratin for stabilizing the foam within the slurry.

In U.S. Pat. No. 6,780,230 and World Patent App. No. WO 03/060018, Hilton et al. disclosed formulations and methods for spray-applying cementitious fireproofing compositions onto a substrate. Pumpable cementitious slurry is formed and mixed with air, and then the slurry is subjected to mechanically created turbulence to generate gas bubbles and create a foam which is preferably stabilized by the presence of polyvinyl alcohol contained in the slurry. The slurry is pumped through hoses to a nozzle for spray application. However, prior to dispensing, a set accelerator is injected into the foam slurry which causes the foam to gel, which in turn improves the hangability of the foam on the substrate.

Thus, various foamed cementitious systems are known in the art for a variety of applications and uses in the building and construction industries.

SUMMARY OF THE INVENTION

In surmounting the disadvantages of the prior art, the present invention provides dynamically and dimensionally stable cementitious foam slurries, methods for making cementitious foam slurries, as well as cementitious foam compositions, materials, and articles which are made from these methods and foam slurry compositions and which may be used as an alternative to foamed organic polymers, to cement composites containing lightweight aggregates, and to foamed gypsums.

As will be further described hereinafter, the present invention may be seen as a departure from, and patentable improvement over, U.S. Pat. No. 4,731,389 (Aircrete) which described, as mentioned in the background above, adding a foam containing PVOH and dispersant to a cement component containing magnesium oxide and barium metaborate to initiate setting.

Advantages of the present invention over the prior art include enhanced dynamic stability of the cementitious foam. In other words, a greater degree of uniformity and bubble spacing is achieved while the material is in a pre-hardened yet hardening plastic state, and this enhances, in turn, the dimensional stability of the cementitious foam resulting from the cementitious foam slurry. The enhanced dynamic and dimensional stability is particularly significant when foam density is 0.1 g/cm$^3$ or less.

The present invention achieves dynamic stability without the need for incorporating light weight aggregates due to its dependable, fine, and closed-cell morphology as generated within the foam slurry. Compared to prior art foamed cements at similar densities, cementitious foams of the present invention have significantly lower thermal conductivity, higher compressive strength, and greater resistance to degradation from the effects of water.

Dimensional stability is enhanced by modifying the foam stabilizer (e.g., polyvinyl alcohol or "PVOH") such that it is can operate at higher air content. The present inventors realized that the time during which the foam is stable is limited due to cross-linking of the foam stabilizer (PVOH) and due to shrinkage of cementitious foam during hydration and water evaporation. Although a conventional viscosity modifying agent (VMA), such as methylcellulose, can work somewhat to improve foam stability (see e.g., U.S. Pat. No. 2,432,971, No. 4,077,809), the present inventors believe that prior art approaches (e.g., Aircrete patent) fall short because they do not sufficiently focus on providing favorable dynamic conditions by which fine closed-cell bubble structures can be generated during a plastic state and captured in a hardened state without cracking.

An exemplary composition of the invention for making a cross-linked foamed cementitious product comprises: a polycarboxylate surfactant for generating foam (which may be referred to hereinafter "PC"), a foam stabilizer, and a shrinkage reducing admixture (or "SRA") operative to reduce plastic shrinkage in a hydrating cementitious composition. The foam-generating composition preferably further includes a calcium salt (preferably non-chloride), a viscosity modifying agent ("VMA"), a plurality of microfibers, an optional fatty acid water repellent, or mixtures thereof, or all of these optional components.

An exemplary method of the invention comprises combining the above described composition with hydratable cementitious slurry to generate cementitious foam slurry, which would then cure into a hardened cementitious foam material or structure. An exemplary cementitious slurry composition of the invention comprises a hydratable binder comprising Portland cement (which could optionally further comprise secondary cementitious materials such as fly ash, granulated blast furnace slag, limestone, pozzolans, etc.), an expansion agent for expanding by chemical reaction the volume of a cementitious slurry (preferably selected from the group consisting of calcium oxide, magnesium oxide, and calcium sulfoaluminate); and a cross-linking agent for the foam stabilizer (e.g., a borate compound).

Hence, the present invention may also be comprehended in terms of a foam generation system (hereinafter "foam component" or "foam system") and cementitious slurry generation system (hereinafter "slurry component" or "slurry system"), which together provide a cementitious foam slurry that cures or hardens into a hardened mass or three-dimensional structure (e.g., an article such as a board, brick, block, paver, beam, panel, door, window or door frame, column, fence post, or the like).

Thus, in exemplary cementitious foam slurries, foam materials, foam structures (articles), and methods of the present invention, the following components are employed: (i) a PC surfactant for generating foam; (ii) a foam stabilizer (e.g., PVOH, PVA); (iii) a shrinkage reducing admixture; (iv) a calcium salt in the amount of 0%-2.1% by weight of solids based on total weight (the calcium salt being preferably selected from the group consisting of calcium nitrite, calcium nitrate, or a mixture thereof); (v) a viscosity modifying agent; (vi) a hydratable binder comprising Portland cement; (vii) an expansion agent for expanding by chemical reaction the volume of cementitious slurry (the expansion agent being preferably selected from the group consisting of calcium oxide, magnesium oxide, and calcium sulfoaluminate); (viii) a cross-linking agent for the foam stabilizer (preferably selected from the group consisting of a borate, sulfate, gluconate, and mixtures thereof); and (ix) a plurality of microfibers operative to reduce plastic shrinkage cracking of the Portland cement when it is mixed with water in an amount to initiate hydration.

In preferred embodiments, an expansive agent is used for chemically expanding the volume of the cementitious slurry; while the shrinkage reducing admixture (SRA) is employed to reduce drying shrinkage as well as some plastic shrinkage of the cementitious slurry, and microfibers are employed to provide mechanical restraint to plastic and drying shrinkage of the cementitious slurry.

Although it may be possible to omit the use of a calcium salt if the foam is being generated in a static mixer, it is desirable to employ a calcium salt, such as calcium nitrite, to slow cross-linking of the foam stabilizer (e.g., PVOH). The cross-linking of the foam stabilizer otherwise creates further unwanted shrinkage, and also offsets the retardation of cement component due to borate cross-linking agent. The calcium salt moreover acts to accelerate the setting of cement, and this can offset the retarding effect of borates used for cross-linking the foam stabilizer (PVOH).

In exemplary cementitious foam slurry compositions and methods of the invention, the foam system can include the calcium salt (calcium nitrite), while the cementitious slurry system can include a borate cross-linking agent for the foam stabilizer (e.g., sodium metaborate). These dynamic characteristics mentioned above would be particularly advantageous where the foam and slurry components are separately packaged and separately mixed with water to create separate foam and slurry systems. For example, calcium nitrite would act to slow cross-linking of the PVOH foam stabilizer when water is added to generate the foam; and the borate compound would retard the setting of the cement when water is added to generate the slurry; and then, after the foam and slurry are formed separately and then mixed together, the calcium would act to accelerate the cement while the borate would act to cross-link the [borate] foam stabilizer.

Microfibers may be used in the foam system, cementitious slurry system, or in both systems to enhance the ability of the foam and/or slurry to resist segregation of components and to prevent micro-cracking during shrinkage, particularly at low densities. Exemplary microfibers have an effective diameter of 5-50 microns, and are made of cellulose or, more preferably, a synthetic polymer (e.g., polyolefin). Preferred microfibers are made of polyethylene, polypropylene, or blends and mixtures thereof, and are coated with a shrinkage reducing admixture (SRA) or agent to enhance bond strength in cement (See e.g., U.S. Pat. No. 5,399,195).

The exemplary cementitious foams of the invention may be made by combining water with a unitary mixture containing both the foam system components and slurry system components. More preferably, the cementitious foams are made by separately making the foam and slurry and then combining the separately generated foam and slurry systems together.

The foam and slurry components may be packaged separately for this purpose. As an example, components (i) through (v) can comprise the foam package, while components (vi) through (viii) can comprise the slurry package. The microfiber component (ix) may be incorporated in either or both packages. In other exemplary embodiments, the calcium salt component (iv) can be included in the slurry rather than foam system. In still further exemplary embodiments, it is possible to package the PC surfactant component (i) in both of the foam and slurry packages. Similarly, the SRA component can be packaged as part of either or both of the foam and slurry packages.

An exemplary method of the invention comprises mixing components (i) through (ix) with water to generate cementitious foam slurry, which then hardens into a mass or is shaped into a hardened article or structure. Exemplary methods include molding the cementitious foam slurry into structures (e.g., boards, panels, beams, bricks, blocks, etc.); injecting it into cavities (e.g., cavities in walls or ceilings); and spray-applying it against surfaces and substrates (e.g., in the nature of spray-applied fireproofing or insulation against building structures, beams, panels, etc.). The methods of the invention do not require autoclaving or the use of metallic additives that generate interconnected air voids.

The present invention also provides cementitious foams as well as articles and structures made from the aforementioned cementitious foam slurries and methods. In still further embodiments, one or more optional components may be incorporated in either or both of the foam and slurry systems, including, without limitation, air entraining agents, air detraining agents, hydrophobic agents (e.g., fatty acids), filler particles (e.g., fine particulates of cement, limestone, silica fume, pozzolans, inert fillers), and structural reinforcing fibers (i.e., "macrofibers").

Various aggregates may be optionally added, including light weight aggregates (e.g., polystyrene beads), as well as conventional aggregates, such as sand to make a lightweight mortar and crushed gravel to make a lightweight concrete. Cementitious foam slurries of the present invention may be incorporated into conventional mortars and cements to lower the density using a highly stabilized air structure.

In addition to cementitious foam compositions, and to components and methods for making the same, the present invention also provides articles made from the cementitious foam and foam slurry compositions of the invention. Exemplary articles include sheet substrates, such as: wallboards to replace (e.g., to substitute for) gypsum-based dry wall; roof decking to replace oriented strand board; and panels to replace polyurethane foam insulation.

In further embodiments, cementitious foams of the invention may be sold as part of laminated, coated, or injected assemblies—such as pre-waterproofed exterior wall boards or roof decking having pre-attached or pre-adhered waterproofing membrane, vinyl-clad clapboards for house exteriors, or as foam core in steel doors—because gaps and discontinuities at the interface between the cementitious foam and other materials are minimized.

Further advantages, features, exemplary embodiments, and exemplary applications of the invention are described in further detail hereinafter.

BRIEF DESCRIPTION OF THE DRAWINGS

An appreciation of the benefits and features of the present invention may be more readily apprehended by considering the following written description of exemplary embodiments in conjunction with the drawings, wherein.

DETAILED DESCRIPTION OF EXEMPLARY EMBODIMENTS

Figure 1:
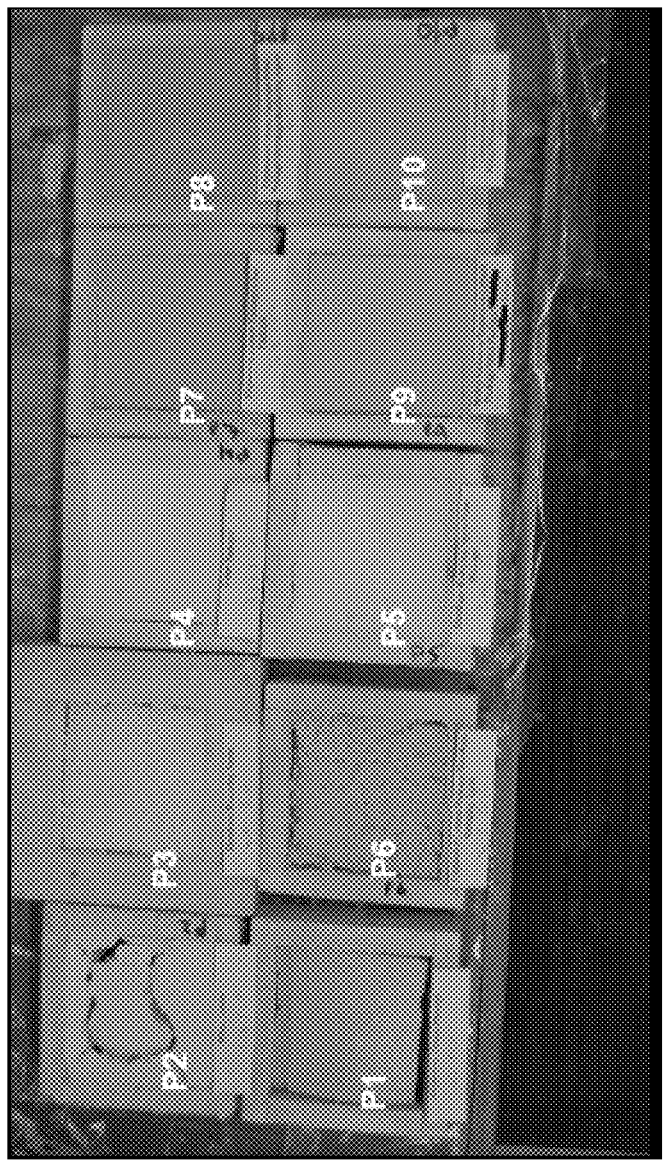
FIG. 1 is a photograph of ten different air-dried cementitious foam samples described in Example 1 wherein samples P1-P9 demonstrated gaps at form walls, cracking, and/or overall reductions in volume, and sample P10 demonstrated excellent dimensional stability.

All parts and percentages of components described herein are by weight unless otherwise indicated. The term "S/S" means weight of solid additive based on weight of the hydraulic cement.

Reference to a salt or acid will be understood to refer to and to include the corresponding acid or salt unless otherwise indicated or contextually impermissible. Those of ordinary skill in the art will realize that references herein to a salt (e.g., polycarboxylate, borate) includes the corresponding acid (polycarboxylic acid, boric acid), and vice versa; as it may be possible for both salt and acid forms to co-exist or for one of these forms to predominate to exclusion of the other, depending on conditions.

The term "Portland cement" as used herein means the general composition as generally described in the Background section. This term includes hydratable cement which is produced by pulverizing clinker consisting of hydraulic calcium silicates and one or more forms of calcium sulfate (gypsum) as an interground additive.

The term "cementitious" as used herein refers to materials that comprise Portland cement or which otherwise function as a binder to hold together fine aggregates (e.g., sand), coarse aggregates (e.g., crushed gravel), or mixtures thereof. Such cementitious materials may further include fly ash, granulated blast furnace slag, lime stone, silica fume, or other pozzolans or pozzolanic material which may be combined with Portland cement or be used to replace or substitute for a portion of the Portland cement without serious diminishment of hydratable properties.

The term "hydratable" as used herein is intended to refer to cement or cementitious materials that are hardened by chemical interaction with water. Portland cement clinker is a partially fused mass primarily composed of hydratable calcium silicates. The calcium silicates are essentially a mixture of tricalcium silicate ($3CaO \cdot SiO2$) and dicalcium silicate ($2CaO \cdot SiO2$) in which the former is the dominant form. See e.g., Dodson, Vance H., *Concrete Admixtures* (Van Nostrand Reinhold, New York N.Y. 1990), page 1.

The term "slurry" is often used herein to refer to a cementitious slurry, or paste, which is formed by mixing together the cementitious material (e.g., Portland cement or other cementitious material alone, or a mixture of Portland cement and one or more other cementitious materials) with water to initiate the hydration (or curing) reaction which results in a hardened cementitious mass or structure. The terms "structure" and "article" may be used interchangeably herein.

The term "mortar" as used herein will typically refer to a cement, cementitious mixture, or cementitious slurry having a fine aggregate, such as sand, while the term "concrete" will refer to a mortar further comprising a coarse aggregate, such as crushed stones or gravel. Hence, it will be understood that the present invention will also provide cementitious foam mortars and concretes by combining the cementitious foam slurry with conventional mortars and concretes. Exemplary lightweight mortars and concretes can also be achieved by optionally incorporating lightweight aggregates (e.g., polystyrene beads) with cementitious foam slurries made in accordance with the present invention.

As previously summarized, exemplary cementitious foam compositions of the invention, comprise: (i) a polycarboxylate surfactant; (ii) a foam stabilizer; (iii) a shrinkage reducing admixture. Preferred foam and foam-generating systems may further comprise a (iv) calcium salt (preferably non-chloride), (v) a viscosity modifying agent, a plurality of microfibers, a fatty acid water repellent, or mixtures thereof, or all of these optional components.

The exemplary foam composition can be introduced, either in dry powder or wet (foamed) form, into conventional mortars and concretes to generate light weight structures and articles (products), and, more preferably, are combined with cementitious slurry-generating component systems of the invention, which comprise an expansive agent and a borate compound.

Thus, an exemplary "cementitious foam slurry" (when wet) or "cementitious foam" (when dry) of the present invention comprises: (i) polycarboxylate surfactant for generating foam; (ii) a foam stabilizer; (iii) a shrinkage reducing admixture operative to reduce plastic shrinkage in a hydrating cementitious composition; (iv) a calcium salt in the amount of 0-2.1% based on total weight; (v) a viscosity modifying agent; (vi) a hydratable binder comprising Portland cement; (vii) an expansion agent for expanding by chemical reaction the volume of a cementitious slurry; (viii) a cross-linking agent for the foam stabilizer; and (ix) a plurality of microfibers operative to reduce plastic shrinkage cracking of the Portland cement when it is mixed with water in an amount to initiate hydration of the cement.

The components of the exemplary cementitious foam composition of the invention may be in dry powder form. For example, components (i) through (ix) may be packaged as a unitary mixture to which water can be incorporated and mixed to generate cementitious foam slurry.

Alternatively, components (i) through (v) may be packaged separately as a foam-generating component system "A", and components (vi) through (viii) may be packaged separately as a slurry-generating component "B", with the plurality of microfibers being packaged with either component A or B, or with both of them.

In further exemplary embodiments, it is similarly possible to package the calcium salt (e.g., calcium nitrite) in either or both of the foam and slurry systems.

Additionally, the PC surfactant foam generating component can be included in the cementitious slurry system as well as in the foam system.

Whether packaged in separate containers or in a single container, the dry formulation can be combined with water, at the factory or at the application site, to generate hydratable cementitious foam that can be molded into shape prior to setting and hardening into final shape. For example, the separate foam and slurry components can be mixed with water separately and are stable for at least 15 minutes and when combined provide at least 5 minutes of working time for pouring into a form (mold) or cavity or pumping for injection into a mold or for spray application against a surface or substrate. Alternatively, all the materials can be mixed together with water and then the foam volume enhanced by using a high shear mixer (such as Hobart with large blade for entraining air into the mix), a static mixer (wherein air and liquid are sent through a porous medium or tortuous path to produce foam), or through an air injected hose and nozzle as disclosed in U.S. Pat. No. 6,780,230 B2. In case of spray application or injection, however, it may be preferable to add the borate last, such as near the injector or hose nozzle.

The relative percentage amounts of the afore-mentioned components will depend greatly upon the desired density of the final cementitious foam product or structure to be made. For example, lower density cementitious foams will likely have a smaller percentage of the cementitious slurry components, while higher relative density cementitious foams will have a greater percentage of the cementitious slurry components.

Exemplary percentage ranges for the afore-mentioned components are provided as set forth below. All percentages reflect solids of components based on total weight of these components and water into which the components are mixed for making the final cementitious foam slurry.

| | |
|---|---|
| (i) polycarboxylate surfactant | 0.1-1.5% |
| (ii) foam stabilizer | 1.5-6.0% |
| (iii) shrinkage reducing admixture | 1.0-3.5% |
| (iv) calcium salt | 0.0-2.1% |
| (v) viscosity modifying agent | 0.01-0.2% |
| (vi) hydratable binder | 21.0-40.0% |
| (vii) expansion ag | 5.0-12.5% |
| (viii) cross-linking agent for foam stabilizer | 0.05-1.0% |
| (ix) microfibers | 0.1-1.7% |

Note that the above percentages do not add up to 100% (because water would be used to make up the remainder). The lower percentage in the ranges suggested above may even be lower in case certain optional components are incorporated into the foam and/or slurry systems, such as lightweight aggregates (e.g., perlite, polystyrene beads, shredded expanded polystyrene), sand, crushed stones or gravels, particle fillers, etc.). The afore-mentioned components (i) through (ix) of the cementitious foam compositions of the invention are further described in detail in the paragraphs which follow.

(i) Polycarboxylate Surfactant. Exemplary polycarboxylate surfactants suitable for use in the invention include conventional polycarboxylic acid or salt type cement dispersants, especially those which do not contain added defoaming agents and which do not have excessive superplasticizing capabilities.

A preferred polycarboxylate surfactant which is particularly suitable for use in the present invention, because it has high entraining capacity, is commercially available from Rohm & Haas (now part of Dow Chemical) under the trade name TAMOL™. For example, the product TAMOL™ 731A (the "A" designates that this product is dissolved in solution, while "DP" designates a dry powder which can be re-dissolved in an aqueous solution) is a copolymer of maleic acid and diisobutylene. Thus, preferred PC surfactants include diisobutylene-maleic acid copolymers and the sodium or ammonium salts thereof. TAMOL™ 731A is provided as the sodium salt of the acid, having pH of about 10, and solids of 25% with water as diluent. Molecular weight is approximately 10,000 Daltons.

(ii) Foam Stabilizer. Exemplary foam stabilizers are selected from the group consisting of polyvinyl alcohol (PVOH), polyvinyl acetate (PVA), or mixture thereof. PVOH having various degrees of hydrolysis may be used. As demonstrated later in one of the examples, it was discovered that costs can be lowered for low density foams by lowering the PVOH content by substituting added amounts of methyl cellulose for portions of the PVOH (See Example 20).

(iii) Shrinkage Reducing Admixture. Exemplary shrinkage reducing admixtures ("SRAs") suitable for use in the present invention include known SRAs, as disclosed in U.S. Pat. Nos. 5,556,460, 5,618,344, 5,779,788, 5,603,760, 5,622,558, 6,277,191, and others. Preferred SRAs are those which are not strongly defoaming.

For example, a preferred SRA is an alkylene glycol represented by the general formula HOBOH wherein B represents a $C_3$-$C_{12}$ alkylene group, preferably a $C_5$-$C_8$ alkylene group. Examples of such glycols are 1,6 hexanediol, 1,5-pentanediol, 1,4-pentanediol, 2-methyl-2,4-pentanediol, and the like.

As another example, an exemplary SRA may be a diol such as a secondary and/or tertiary dihydroxy $C_5$-$C_8$ alkane represented by the formula:

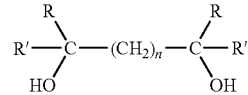

wherein each R independently represents a hydrogen atom or a $C_1$-$C_2$ alkyl group, each R' represents a $C_1$-$C_2$ alkyl group and n represents an integer or 1 or2.

Of the diol-based SRAs, the most preferred is 2-methyl-2, 4-pentanediol, which is sometimes referred to as "hexylene glycol" ("HG").

Generally, the preferred glycols would not include butyl ethers. For example, alkylene glycols believed to be useful for the present invention can include condensed alkylene glycols represented by the formula $HO(AO)_xH$ wherein A represents a propylene and more preferably an ethylene or methylene; O represents an oxygen atom and x is an integer of from 1 to about 20, preferably from 1 to 10, provided the diol is soluble in water. The AO group in a particular glycol molecule may all be the same or different. Examples of such glycols include diethylene glycol, dipropylene glycol, tripropylene glycol, di(oxyethylene)di(oxypropylene)glycol as well as poly(oxyalkylene)glycols. The AO groups of such polyoxyalkylene glycols may be of single alkylene or a mixture of alkylene groups which are in either block or random configuration.

(iv) Calcium Salt. The use of calcium salts in the either the foam or cementitious slurry system is preferred in most cases, unless the cementitious foam is being generated in a static mixer. Calcium chloride can be used, but non-chloride salts are preferred due to the corrosion damage caused by chloride to metals. Thus, a preferred calcium salt is calcium nitrite, calcium nitrate, or a mixture thereof. The calcium salt is believed to slow the cross-linking of the foam stabilizer (e.g., PVOH) while acting also as a set accelerator for the hydratable cementitious binder (e.g., Portland cement). The use of calcium nitrite is preferred. Calcium nitrate may be used in combination with the calcium nitrite in up to a 50:50 weight ratio.

(v) Viscosity Modifying Agent (VMA). Exemplary VMAs believed to be suitable for purposes of the present invention can be selected from the group consisting of: (a) biopolymer polysaccharides including S-657 (diutan), welan gum, xanthan, rhamsan, gellan, dextran, pullulan, and curdlan; (b) marine gums such as algin, agar, and carrageenan; (c) plant exudates such as locust bean, gum arabic, gum Karaya, tragacanth, and Ghatti; (d) seed gums such as guar, locust bean, okra, psyllium, and mesquite; and (e) associative thickeners such a cellulose (or modified cellulose), hydrophobically modified alkali swellable acrylic copolymer, a hydrophobically modified urethane copolymer, polyurethane thickeners, polyacrylates, polyethers; and derivatives and mixtures of any of the foregoing.

Preferred VMAs include methyl cellulose, hydroxyl ethyl cellulose, methyl hydroxyl cellulose, hydroxyl methyl ethyl cellulose, carboxy methyl cellulose, methyl cellulose, ethyl cellulose, hydroxyl ethyl cellulose, hydroxyl ethyl propyl cellulose, and the like.

The present inventors believe that alkali soluble emulsions ("ASE"), e.g., comprising acrylic acid and/or methacrylic acid monomers, may provide interesting benefits in terms of maintaining dynamic stability of the cementitious foam system. At low pH, the emulsion has low viscosity, but at higher pH the polymer dissolves and increases viscosity of the system. Similar VMA materials include hydrophobically modified alkalie soluble emulsion ("HASE"), hydrophobically modified ethylene oxide urethane ("HEUR"), and hydrophobically modified hydroxyl ethyl cellulose ("HM-HEC"). If such VMA materials were employed, they could be incorporated into a separate foam component, which then could be added to cement component to generate cementitious foam slurry.

(vi) Hydratable Cement(itious) Binder. Cementious foams and slurries of the invention comprise Portland cement, which may be optionally combined with other cementitious materials, such as one or more of fly ash, granulated blast furnace slag, densified silica fume, limestone, and other pozzolans or pozzolanic materials.

In exemplary embodiments of the invention, hydrated cement particles can be used to deliver one or more of the various foam or cementitious slurry components as taught in U.S. Pat. No. 6,648,962 B2 of Berke et al. Thus, one may hydrate cement with calcium nitrite, crush the dried parties, and then coat the crushed particles with SRA (e.g., HG) and a fatty acid (oleic and stearic acid or salt).

If the cementitious slurry component is packaged or prepared separately from the foam generation component, it is preferred for the cementitious slurry component to contain a polycarboxylate surfactant that is identical to or different from the polycarboxylate surfactant used in the foam generation component (see above).

(vii) Expansion Agent. An exemplary expansion agent suitable for use in the invention is selected from calcium oxide, magnesium oxide, calcium sulfoaluminate ("CSA"), or mixtures thereof. The latter is most preferred.

(viii) Cross-linking Agent for Foam Stabilizer. Exemplary agents for cross-linking the foam stabilizer (e.g., PVOH) include borates, sulfates, aluminates, and the like. Barium borate, sodium borate, and sodium tetraborate are preferred. Barium borate is preferred when the foam and slurry components are combined as a pre-mixed material. Sodium borate or tetraborate are preferred where combination with foam stabilizer is of short duration after they are mixed (e.g., such as in spray applications wherein the components and mixed and then sprayed in relatively quick succession).

(ix) Microfibers. Preferably, the microfibers are contained in at least the cementitious slurry component, and may be used in volume fractions up to 1% based on Portland cement fraction without adversely affecting workability.

Exemplary microfibers of the present invention have an average effective diameter (or mean transverse dimension) of 5-50 microns, and more preferably 10-25 microns for fibers under 2 mm long, and 25 to 50 microns for fibers 2 to 8 mm long. The fibers may comprise cellulose or synthetic polymer (e.g., polyolefin), or even be made of glass.

Exemplary microfibers suitable for use in the present invention are disclosed in U.S. Pat. No. 5,399,195 of Hansen et al. These microfibers comprise a polyolefin, a polyolefin derivative, a polyester, or mixture thereof, and have an average length of 1-30 mm, a mean transverse dimension of 5-30 um, and an aspect ratio of 100 to 1000.

Most preferred microfibers for use in the present invention include the coated fibers taught by Neal Berke et al. in U.S. Pat. No. 5,753,368. These fibers are coated by a type of material operative to reduce plastic shrinkage of cement. For example, Berke et al. disclosed in Example 2 the use of polypropylene fibers having a length of about two inches (about 5 cm) and a diameter of 0.0255×0.0395 inches, which were coated with di-propylene glycol-t-butyl ether ("DPTB") for enhanced concrete bonding strength and improved pull-out resistance. Berke et al. taught the use of polypropylene fibers coated with a material selected from particular glycol ethers (such as DPTB), having at least three carbon atoms in an oxyalkylene group, and glycerol ethers (such as di-t-butyl glycerol).

Preferred microfibers suitable for use in the present invention are comprised of polypropylene and having sufficiently small dimensions operative to inhibit self-induced, or so-called plastic shrinkage, and preferably having a coating operative to decrease air entrainment at the paste-fiber interface, thereby enhancing wetting between hydrophobic fiber material and the hydrophilic matrix of the cement, resulting in increased bond strength between the fiber and cement paste. The coating material may comprise DPTB or other known SRAs (e.g., hexylene glycol), as described elsewhere in this specification, or as otherwise known in the concrete industry.

Microfibers may be packaged with the other components (i)-(viii) in a unitary mixture, or, where separate foam-generating and slurry-generating system components are separately packaged, preferably with both of the system components and at least with the cementitious slurry-generating component system.

Optional Macrofibers (Reinforcing Fibers). In further exemplary embodiments, longer and larger fibers may optionally be incorporated into the cementitious foam to enhance its mechanical properties.

For example, a polypropylene reinforcing fiber, having a flat noodle shape, is commercially available from Grace Construction Products, Cambridge, Mass. USA, under the trade name "STRUX®." The advantage of using these fibers over glass fibers is their lower density, and their advantage over cellulose is their enhanced workability and chemical resistance. The amount of such fibers used can be up to one or even two percent by weight based on the total weight of the cementitious foam slurry composition in accordance with the invention.

Commercially available structural reinforcing fibers that may not possess the same modulus of elasticity and/or individual load carrying capability of the STRUX® brand fibers are also suitable for use in the present invention, since the overall strength of the foam matrixes is much lower than that of normal weight concrete.

Generally, the dimensions of suitable structural reinforcing fibers, which may be referred to as "macrofibers" in contrast to the above-described microfibers, and such macrofibers have an average width (or equivalent diameter) of 1.0-5.0 mm, an average thickness (where quadrilaterial in cross-section) of 0.05-0.2 mm, and average individual fiber length of 20-75 mm.

Other Optional Additives, Particles, and Fillers. In further embodiments, one or more conventional concrete additives, admixtures, and fillers may be incorporated and used where specific benefits are desired.

For example, conventional fatty acids or their salts may be incorporated to the foam system to achieve water repellency. Fatty acids should not work to defoam the cementitious slurry, and thus non-defoaming fatty acids should be used. Examples include oleic acid and stearic acid. A calcium stearate suspension, provided in the form of finely ground calcium stearate powder, dispersed in an aqueous carrier, is commercially available from Grace under the tradename DARAPEL®. The fatty acids should not be air detraining (e.g., containing butyl groups such as butyl stearate or butyl oleate). Mixtures containing various fatty acids are commercially available and may be used so long as they do not defoam or otherwise detrain substantial amounts of air from the cementitious foams and slurries.

Fine particles may also be added into foam and/or slurry system. For example, crushed limestone, silica fume, mica, wollastonite, vermiculite, and talc may be added to the foam as mini-shear enhancers. Such fine particles should be inert in water, and may permit the air volume to be controlled in more predictable fashion in some cases. The particles can be advantageously mixed in with either or both of the foam and slurry components, such as with the microfibers. Silica fume can be used preferably in separate foaming packages.

Other fillers can be used to make mortars and concretes. Exemplary cementitious foams and foam slurries of the invention may further include sand (as a fine aggregate) to make light weight mortars, and coarse aggregates such as crushed stone or concrete to make a light weight concrete. Fillers such as bauxite and other clays can be used to increase density.

There are a number of exemplary methods of the invention for generating the cementitious foam compositions, materials, and articles of the invention.

One such method is to add the foam components into a high shear mixer until the specific gravity is approximately 0.05. The cementitious slurry components may be mixed separately at the same time, but does not require high shear mixing. The separate foam and slurry components are then mixed into each other, and macrofibers (e.g., STRUX® reinforcing fibers) are added at this time if desired. The cementitious foam slurry is then either pumped, poured, or pumped to spray application. If sprayed or pumped, borate or additional borate and/or carbonate source can be added at the end of the spray or pump to accelerate hardening by cross-linking and reacting the cement.

A second exemplary method, which is similar to the first, is to mix all components together with water at moderate shear and then pump the mixed components through a hose using air pressure, similar to what was disclosed in U.S. Pat. No. 6,780,230 B2. Alternatively, the separate foam and separate cementitious slurry components can be mixed separately as in the first method, but without the high sheer mixing, and added in two streams to the air pressurized spray hose.

A third exemplary method is to add all materials together in a high shear mixer to produce the cementitious foam slurry. The foam slurry can then be pumped, poured, sprayed, or trowelled into place, into a form or mold or cavity, or otherwise against a surface or substrate. The materials can be combination of dry and wet components to which water is added, or they can be provided in dry form to which water is added.

A particularly advantageous feature of the present invention is that the density of the cementitious foam can be controlled by adjusting the cement content and/or the addition of optional aggregates. The foam formulations with the addition of fine particles produce a uniform volume of foam under high shear mixing. If the fine particles are not added, then the foam will increase in volume upon mixing with the cementitious slurry; and increasing the amount of the slurry does not increase density as much as calculated from the volume of slurry added. If the foam portion has fine particles, then the increase in density is closer to what would be calculated. This allows for standard foam compositions that can be used to make materials from 0.05 to greater than 1.0 Sp.G (Specific Gravity).

In further exemplary compositions and methods of the invention, the cementitious foam slurries, and the cementitious foam masses or articles which are hardened into form from such slurries, may further comprise one or more of the following conventional additives or fillers: (a) a lightweight aggregate selected from the group consisting of vermiculite, expanded polystyrene, perlite, and mixtures thereof; (b) a macrofiber (e.g., structural reinforcing fiber, which can be made from polyolefin such as polyethylene, polypropylene, or blend thereof); (c) a water repellant agent; (d) particles of cement, supplemental cementitious material, or filler having an average particle size of no greater than 1 mm; (e) fine aggregate (e.g., sand); (f) coarse aggregate (e.g., crushed stone or gravel having average particle size of 0.5-2.0 cm); or (g) mixture of any of the foregoing.

Cementitious foam materials of the invention can be made air-impermeable by increasing specific gravity (Sp.G) to about 0.2. At a higher Sp.G, such material has a higher R value and lower K value compared to other lightweight cementitious materials.

The cementitious foams of the invention, as previously mentioned, can be used to produce boards and other shapes that can be reinforced with mesh, membranes (e.g., plastic sheeting, pre-formed waterproofing adhesives), or aluminum backing. The present inventors believe that other thin metals would work also. The use of mesh on one side of a board or other article shape can facilitate drying of the cementitious foam material cast or formed against it. A mesh can be made of plastic, steel, aluminum, fiberglass, or other material.

Cementitious foam slurries of the invention may cast against sheet materials to provide enhanced waterproofing and barrier protection, along with structural mechanical enforcement. The sheet can be a waterproofing membrane such as commercially available from Grace Construction Products under the trade names PREPRUFE®, FLORPRUF®, ICE & WATER SHIELD@, PERMA-BARRIER®, VYCOR®, and TRI-FLEX®. The waterproofing membrane can have a pre-formed adhesive layer operative to adhere a polymeric support layer to the cementitious foam. In the case of the PREPRUFE® membrane (which is designed particularly for "blind-side" applications where fresh mortar or concrete may be cast against the adhesive side), it is particularly appropriate to cast the cementitious slurry foam against the adhesive and allow it to cure against the membrane. The sheet can also be aluminum foil for added reflectivity and impermeability. One of the advantageous features of the cementitious foam slurries of the present invention is that calcium nitrite will protect the aluminum from alkaline attack from the cement.

Board articles can be manufactured, and depending on their density can be used for fire protection, thermal insulation, or combination of these properties. These boards can be used as replacements or substitutes for gypsum board, DENS GLAS GOLD® boards, sheetrock, plywood, and the like, with lower weight per board foot and higher R values (at similar densities), for either interior or exterior application. The boards work well with dry wall fasteners and can be nailed.

Moreover, such boards or other articles made from the cementitious foams of the invention can be dried at room temperature or elevated temperatures without requiring autoclaving. For example, a temperature of 60 degrees Celsius is sufficient for this purpose.

The materials of the invention can be poured or pumped onto roofs as an insulating barrier which provides up to, or even more than, twice the R value obtained from commercially available (prior art) cementitious materials.

Indeed, the cementitious foam slurries of the invention can be poured or injected into shaped molds and hardened to assume the shape of the mold or form, which can be removed or which can become integrally attached, bonded, or adhered part or outer surface of the resultant structure. For example, the cementitious foam slurries (preferably further containing macrofibers, aggregates, sand, stones, and/or other fillers) can be poured into metal, plastic, or wood molds to form a door or other building material, such as blocks (e.g., cinder blocks, masonry blocks), bricks, pavers, window or door framing, posts for use in fences, or in sound barriers.

Another exemplary application is the use of spraying or pumping of the cementitious foam to achieve an R value of 3.3 or higher. Another advantage over current pumped or sprayed materials is the fact that the inorganic matrix of the cementitious foams provides fire resistance without using toxic foaming agents. Moreover, the cementitious foam in its hardened state does not warp at slightly elevated temperatures (around 60 degrees C.) which can be caused by direct sunlight or heating sources. Thus, useful applications in view of this feature include cavity walls and exterior wall insulation.

Other articles and applications of the cementitious foams of the invention include sound proofing, either in preformed panels or as a poured underlayment or filling for wall cavities, as decorative shapes (such as house moldings, fence posts, etc.), and siding for houses. As previously mentioned in the summary, exemplary articles of the invention include laminated, coated, or injected assemblies, such as pre-waterproofed exterior wall boards or roof decking (e.g., having pre-attached or pre-adhered waterproofing membrane), vinyl-clad clapboards for house exteriors, or as foam core in steel doors.

Exemplary very low density cementitious foams and three-dimensional structures (articles) may have, for example, specific gravity under 0.1 g/cm$^3$ and insulation (k) value under 0.045 W/(m° K.), and this is believed to be suitable for use as insulation material, such as for use in walls.

Exemplary low density cementitious foams and structures of the invention may have a specific gravity between 0.1-0.35 g/cm$^3$ and an insulation (k) value under 0.05 W/(m° K.), and this is believed to be suitable for spray, pumping, pouring, or trowel applications, particularly where one side might be exposed to the air.

Exemplary medium density cementitious foams and structures of the invention may have a specific gravity between 0.35-0.45 g/cm$^3$ and an insulation (k) value under 0.05 W/(m° K.), and this is believed to be suitable for insulating concrete for use on roofs and cavities, with or without reinforcing meshes, waterproofing membranes (e.g., underlayments), can be used to replace gypsum boards, autoclave blocks, decorative cementitious objects, sound insulation, or panels (such as may be used as siding material for houses and buildings).

Further exemplary moderate density cementitious foams and structures of the invention may have a specific gravity between 0.45-0.7 g/cm$^3$ and an insulation (k) value under 0.08 W/(m° K.), and these can be used as higher density material for the applications noted above for medium density foams.

Further exemplary light-weight cementitious foams and structures of the invention may have a specific gravity between 0.7-1.0 g/cm$^3$ and an insulation (k) value under 0.1 W/(m° K.), and these can be used as higher density material for the applications noted above for medium and moderate density foams, where higher strength and durability are needed.

Finally, light-weight cementitious foams and structures of the invention may have a specific gravity between 1.0-1.8 g/cm$^3$ and an insulation (k) value under 0.2 W/(m° K.), and these can be used in applications wherein light-weight concrete is used (e.g., floors, blocks for walls, precast concrete panels, glass fiber-reinforced concrete).

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: R=RL+k*(RU−RL), where k is a variable ranging from 1% to 100% with a 1% increment, e.g., k is 1%, 2%, 3%, 4%, 5% ... 50%, 51%, 52% ... 95%, 96%, 97%, 98%, 99%, or 100%. Moreover, any numerical range represented by any two values of R, as calculated above, is also specifically disclosed.

EXAMPLE 1

Ten foam compositions were created by preparing a foam generation system and cementitious slurry system, and mixing them to form cementitious foam slurry within a mold (or form), as follows.

The foam generation system comprises polyvinyl alcohol (PVOH); a polycarboxylate (PC) surfactant (e.g., TAMOL™ 731 DP available from Rohm & Haas); a shrinkage reduction admixture ("SRA" such as hexylene glycol, or "HG" for short); calcium nitrite (which is available from Grace Construction Products, Cambridge, Mass., under the trade name "DCI®"; a viscosity modifying agent (e.g., methylcellulose); and a plurality of microfibers (which were made of polyethylene, had a mean transverse dimension or thickness of about 30-32 um (microns) and which comprised a mixture of polyethylene fibers having average lengths of 1.5 mm and 0.8 mm, respectively). To this foam generation system, water is incorporated and mixed until a self-supporting foam was generated.

The cementitious slurry system comprises a borate (e.g., barium metaborate), an optional polycarboxylate (PC) surfactant (e.g., TAMOL™ 731 DP), a cement (which is optionally white for aesthetic effect), and an expansion agent (e.g., calcium sulfoaluminate, available from Denka). Optional cementitious slurry components were also evaluated: including colloidal cement, which has a very fine average particle size (available from Denka K. K. under the trade name "Super Cement" which has average particle size of under 1 mm); an SRA (e.g., hexylene glycol, or "HG"); and polypropylene reinforcing fibers. For testing purposes, two different sizes of polypropylene (PP) fibers were used, a first batch of PP fibers having an average length of 8 mm, with average equivalent diameter of 5-32 microns; and a second batch of PP fibers having an average length of 5 mm, with average equivalent diameter of 5-32 microns. To this cementitious slurry system, water is incorporated and mixed until relatively uniform slurry was generated.

The amount of each component, indicated as a percentage based on total weight of the cementitious foam compositions, is presented in Table 1.

Each of samples P1 through P10 were cast into expanded polystyrene framed molds and allowed to air dry and the photographs of these samples are shown in FIG. 1.

The foregoing data supports the conclusion that addition of an expansive agent (CSA) or shrinkage reducing agent (HG) alone is not enough to prevent excessive shrinkage, as demonstrated by gaps at the form walls, cracking and a reduction in volume for samples P1 through P9.

It also supports the conclusion that microfibers fibers help with prevention of cracking, but do not eliminate excessive shrinkage. Sample P10 of this invention had the best dimensional stability as well as the highest strength-to-density ratio.

The data supports the conclusion that the calcium nitrite component improved the workability of the material by preventing the early cross-linking of the PVOH component. An added benefit is conferred by the ability of calcium nitrite to offset cement retardation due to the presence of the borate component.

EXAMPLE 2

From Example 1, it was determined that the use of a viscosity modifying agent such as methyl cellulose provided benefits, in combination with the expansion agent (CSA), in terms of enhanced strength-to-density ratio (metric). Sample "P9" contained methyl cellulose, expansion agent, and microfibers. Sample "P10" of the present invention further contained shrinkage reducing admixture (SRA), e.g., hexy-

TABLE 1

| | SAMPLE: | | | | | | | | | |
|---|---|---|---|---|---|---|---|---|---|---|
| | P1 % | P2 % | P3 % | P4 % | P5 % | P6 % | P7 % | P8 % | P9 % | P10 % |
| Foaming Component | | | | | | | | | | |
| PVOH | 4.00 | 4.00 | 4.00 | 3.94 | 3.91 | 4.00 | 3.94 | 3.91 | 3.94 | 3.88 |
| PC Surfactant | 0.64 | 0.64 | 0.64 | 0.63 | 0.63 | 0.64 | 0.63 | 0.63 | 0.63 | 0.62 |
| SRA (HG) | | | 1.92 | | 1.25 | 1.92 | | 1.25 | | 2.17 |
| Calcium Nitrite | 4.83 | 4.83 | 4.80 | 4.73 | 4.70 | 4.80 | 4.73 | 4.70 | 4.72 | 4.65 |
| VMA | | | | | | | | | 0.06 | 0.06 |
| Microfibers 1.5 mm PE | | | | 0.16 | 0.16 | | 0.16 | 0.16 | 0.16 | 0.16 |
| Microfibers 0.8 mm PE | | | | 0.09 | 0.09 | | 0.09 | 0.09 | 0.16 | 0.16 |
| Water | 45.09 | 45.09 | 43.52 | 44.12 | 44.12 | 43.52 | 44.12 | 43.22 | 44.09 | 42.79 |
| Cementitious Slurry | | | | | | | | | | |
| Borate | 0.64 | 0.64 | 0.64 | 0.64 | 0.64 | 0.64 | 0.64 | 0.64 | 0.63 | 0.62 |
| PC Surfactant | 0.32 | 0.32 | 0.32 | 0.32 | 0.31 | 0.32 | 0.32 | 0.31 | 0.31 | 0.31 |
| SRA (HG) | | | | 0.95 | 0.94 | | 0.95 | 0.94 | 0.94 | 0.93 |
| Microfibers 8 mm PP | | | | 0.47 | 0.47 | | 0.47 | 0.47 | 0.47 | 0.47 |
| Microfibers 5 mm PP | | | | 0.47 | 0.47 | | 0.47 | 0.47 | 0.47 | 0.47 |
| Water | 12.24 | 12.24 | 12.16 | 11.98 | 11.90 | 12.16 | 11.98 | 11.90 | 11.97 | 11.78 |
| Cement | 16.10 | 32.21 | 32.00 | 31.52 | 31.32 | 16.00 | 15.76 | 15.66 | 15.75 | 15.50 |
| Colloidal Cement | 8.05 | | | | | 8.00 | 7.88 | 7.83 | 7.87 | 7.75 |
| CSA (expansion) | 8.05 | | | | | 8.00 | 7.88 | 7.83 | 7.87 | 7.75 |
| Total Water/Cement | 1.879 | 1.879 | 1.899 | 1.879 | 1.899 | 1.899 | 1.879 | 1.899 | 1.879 | 1.929 |
| Initial Wet Density (g/cm$^3$) | 0.099 | 0.103 | 0.089 | 0.100 | 0.100 | 0.070 | 0.094 | 0.111 | 0.107 | 0.121 |
| Final Dry Density (g/cm$^3$) | 0.047 | 0.047 | 0.046 | 0.050 | 0.050 | 0.030 | 0.045 | 0.056 | 0.057 | 0.070 |
| Comp. Strength dry (MPa) | 0.028 | 0.031 | 0.010 | 0.060 | 0.072 | 0.023 | 0.119 | 0.208 | 0.158 | 0.283 |
| Strength-to-Density (metric) | 0.60 | 0.66 | 0.22 | 0.21 | 0.146 | 0.76 | 2.63 | 3.73 | 2.78 | 4.06 | lene glycol ("HG"), which increased strength-to-density from 2.78 for P9 to 4.06 for P10.

Figure 2:
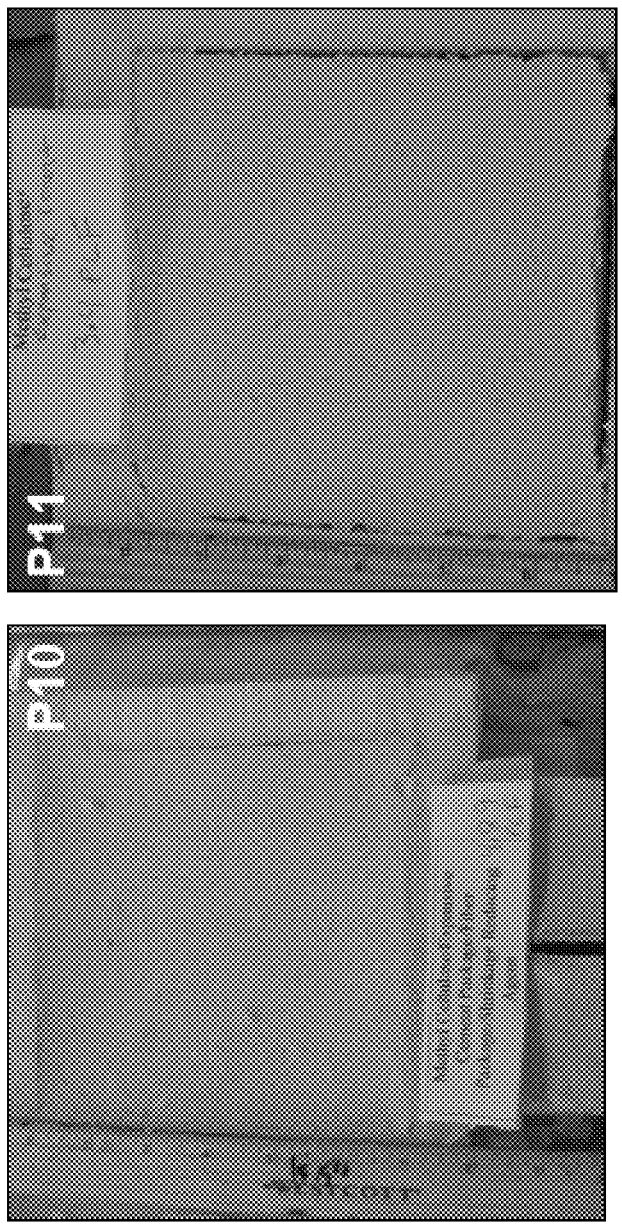
FIG. 2 is a set of side-by-side comparative photographs of air dried cementitious foam sample P10 (left photo) and sample that did not contain SRA or fibers (right photo)

FIG. 2 contains a photograph of the sample P10 containing methylcellulose, expansive agent, and shrinkage reduction agent (left side) compared to another sample which contained only methylcellulose and expansion agent but without shrinkage reduction agent (right side).

Further testing was done to ascertain the effect of removing the SRA and all fiber components (Sample "P11"), decreasing the relative amount of SRA but retaining the fiber components (Sample P12), and removing the calcium nitrite component (Sample P13).

The results are shown in Table 2 below.

TABLE 2

|  | P11 % | P12 % | P13 % |
| --- | --- | --- | --- |
| Foaming Component |  |  |  |
| PC Surfactant | 0.64 | 0.63 | 0.64 |
| Foam Stabilizer (PVOH) | 4.02 | 3.94 | 4.00 |
| SRA (HG) |  |  | 0.32 |
| Calcium Nitrite | 4.83 | 4.72 |  |
| VMA (methyl cellulose) | 0.06 | 0.06 | 0.06 |
| Microfibers 1.5 mm PE |  | 0.16 | 0.16 |
| Microfibers 0.8 mm PE |  | 0.09 | 0.09 |
| Water | 45.09 | 43.78 | 47.68 |
| Cementitious Slurry |  |  |  |
| Borate | 0.64 | 0.63 | 0.64 |
| PC Surfactant | 0.32 | 0.31 | 0.32 |
| SRA (HG) |  | 0.94 | 0.96 |
| Microfibers 8 mm PP |  | 0.47 | 0.47 |
| Microfibers 5 mm PP |  | 0.47 | 0.47 |
| Water | 12.23 | 11.97 | 12.26 |
| Cement | 16.09 | 15.75 | 16.00 |
| Denka Colloidal | 8.05 | 7.87 | 8.00 |
| Expansion (Denka CSA) | 8.05 | 7.76 | 8.00 |
| Total Water/Cement | 1.879 | 1.879 | 1.879 |
| Initial Wet Density (g/cm$^3$) | 0.11 | 0.13 | 0.18 |
| Final Dry Density (g/cm$^3$) | 0.05 | 0.06 | 0.08 |
| Comp Strength dry (MPa) | 0.09 | 0.20 | 0.28 |
| Strength-to-Density Ratio | 1.65 | 3.32 | 3.73 |

EXAMPLE 3

Eliminating calcium nitrite increased density, as shown by Sample P13 in Table 2 above. It was also observed that workability of the P13 sample mixture and pot life was reduced. This behavior appears consistent with the fact that the calcium nitrite acts as a retarder for cross-linking PVOH.

Figure 3:
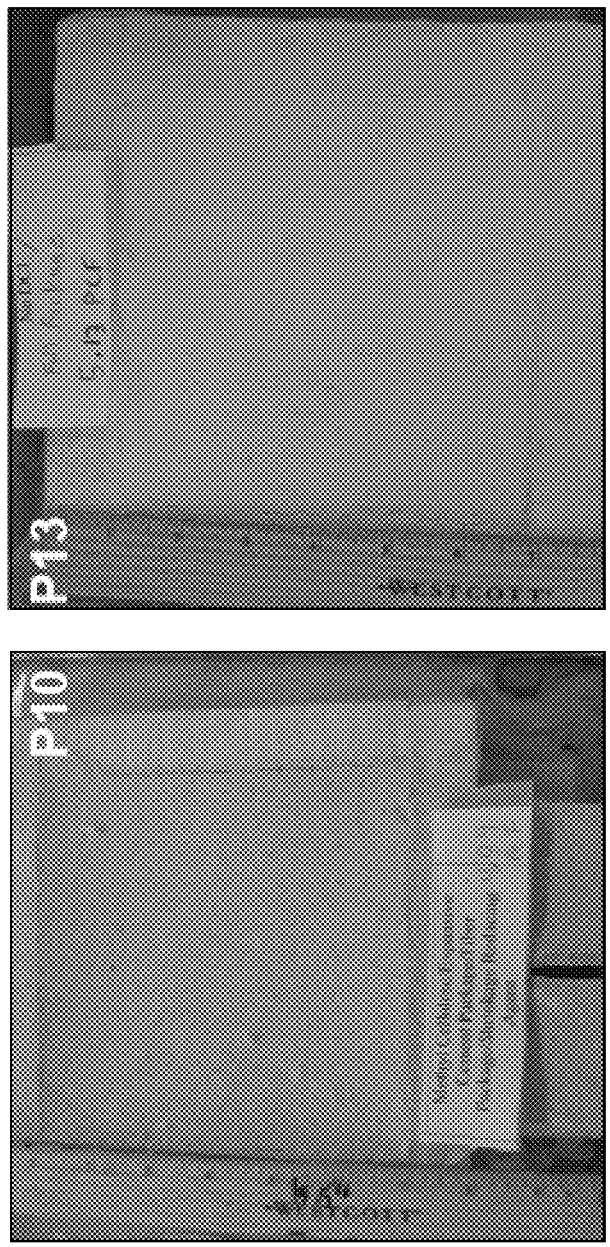
FIG. 3 is a set of side-by-side comparative photographs of air dried cementitious foam sample P10 (left photo) and sample that did not contain calcium nitrite (right photo)

This result is illustrated in FIG. 3, which is a set of side-by-side comparative photographs of air dried cementitious foam sample P10 (left photo) which contained calcium nitrite, and sample 13 that did not contain calcium nitrite (right photo). The right photo of the calcium nitrite-free sample demonstrated that shrinkage was still controlled (no visible pulling away from wooden form), so this formulation could be used if the material is placed quickly after mixing. However, as mentioned above, the density was higher than sample P10 on left.

EXAMPLE 4

The thermal conductivity (k) of various sample cementitious foam compositions made in accordance with the invention, as a function of density, is provided in Table 3 below, and plotted against values of commercial materials in FIG. 4.

TABLE 3

| Sample Numbers | Density (g/cm$^3$) | W/(m · K) |
| --- | --- | --- |
| P14 | 0.0671 | 0.0345 |
| P14 | 0.0671 | 0.0373 |
| P14 | 0.0673 | 0.0404 |
| P15 | 0.1463 | 0.0425 |
| P15 + P16 | 0.1768 | 0.0424 |
| P16 | 0.2066 | 0.0416 |
| P17 | 0.5466 | 0.0533 |
| P18 | 0.1109 | 0.036 |
| P19 | 0.1162 | 0.0377 |
| P21 | 0.6742 | 0.0655 |
| P20 | 0.2772 | 0.0432 |
| P26 | 0.0764 | 0.0401 |
| P31 | 0.0728 | 0.0352 |
| P31 | 0.0728 | 0.0401 |
| P31 | 0.0707 | 0.0405 |
| P23 | 0.2104 | 0.041 |
| P26 | 0.0593 | 0.0412 |
| P26 | 0.0641 | 0.039 |
| P30 | 0.1830 | 0.0374 |
| P30 | 0.1841 | 0.036 |
| P30 | 0.2147 | 0.0461 |
| P34 | 1.8968 | 0.1862 |
| PRIOR ART SAMPLES BELOW |  |  |
| Light Weight Concrete (LWC) | 0.3205 | 0.1008 |
| Insulating LWC | 0.4808 | 0.1442 |
| Insulating LWC | 0.6410 | 0.1737 |
| Insulating LWC | 0.9615 | 0.2773 |
| Structural LWC | 1.4423 | 0.4807 |
| Structural LWC | 1.7628 | 0.7591 |
| Structural LWC | 1.9231 | 1.0302 |
| Normal Weight Concrete | 2.4038 | 2.2189 |
| Typical Gypsum Board | 0.7692 | 0.1601 |
| Georgia Pacific Dens Glass Gold ® | 0.8814 | 0.1254 |
| Zonolite ® Insulating Concrete for Roof Deck | 0.4006 | 0.0968 |
| Insulcel ® Insulating Concrete for Roof Deck | 0.5288 | 0.1109 |
| Zonocel ® Insulating Concrete for Roof Deck | 0.5288 | 0.1311 |
| Insulperm Insulating XPS Board (component of Siplast roofing systems) | 0.0160 | 0.03605 |

Note that Sample P17 used PVOH having 87.5-89% hydrolyzed.

Figure 4:
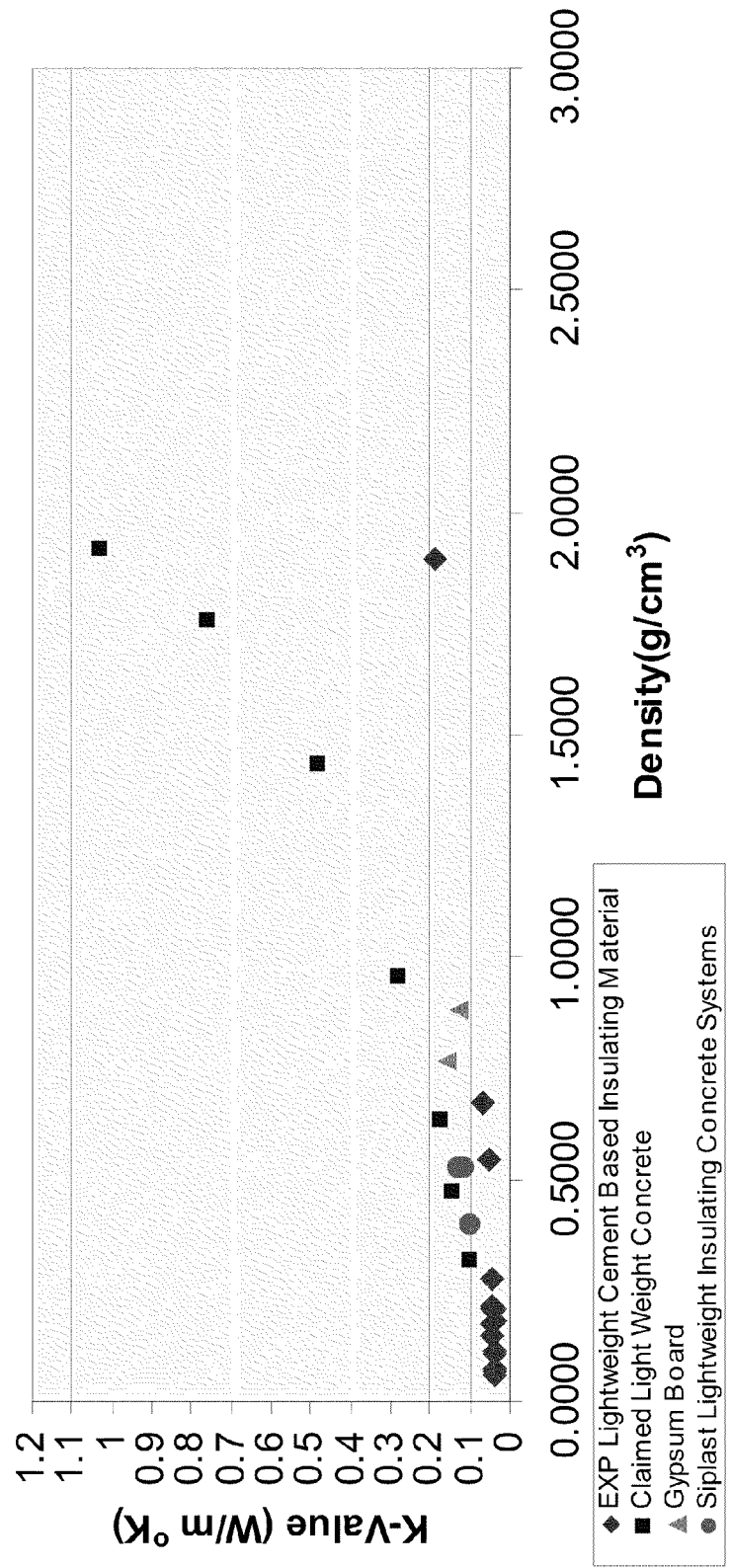
FIG. 4 is a graph plot of density (horizontal axis) against K-value (vertical axis) based on published insulation performance values for commercially available inorganic insulation materials which included lightweight cement-based insulation; a "light weight" concrete; a gypsum board; and a lightweight insulating concrete.

FIG. 4 is a graph plot of density (horizontal axis) against K-value (vertical axis) of published values for commercial inorganic insulation materials, which included lightweight cement-based insulating material, a so-called "light weight" concrete, gypsum board, and lightweight insulating concrete (available from SIPLAST Corporation).

In contrast, it will be seen that cementitious foam materials of the present invention will have lower k values than commercially available inorganic materials at the same density levels.

In addition, the k values at densities between approximately 0.05 and 0.25 g/cm3 are close to each other even though there is a significant increase in density. This occurs because unlike other systems, the cementitious foams of the present invention have closed-cell structures at a relatively low density of about 0.19 g/cm3, as shown by the sharp drop off in air permeability in FIG. 5, and the micrograph FIG. 6.

Figure 5:
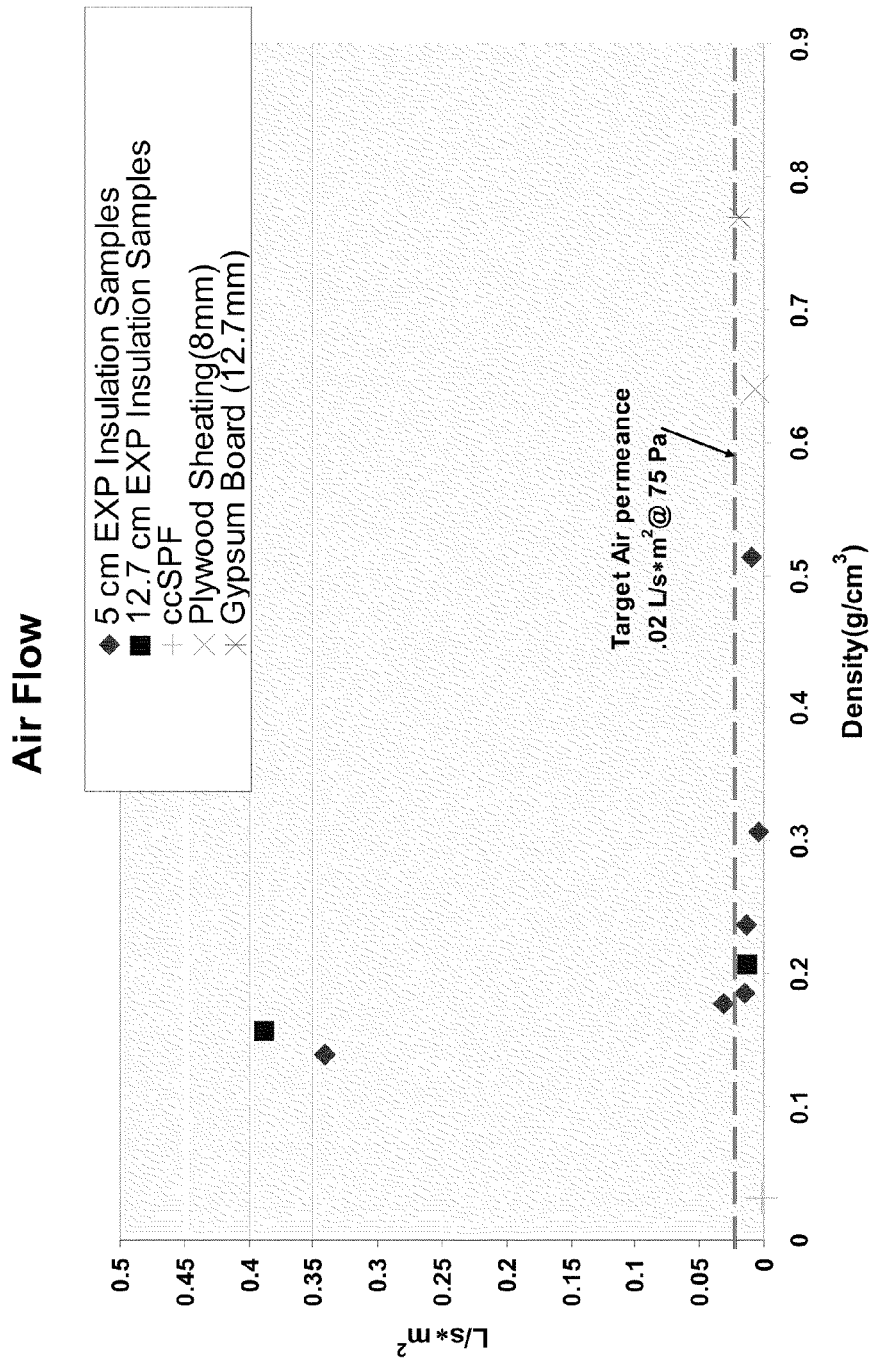
FIG. 5 is a graph plot of density (horizontal axis) against air permeability (vertical axis) of commercially available insulation, plywood sheeting, and gypsum board.

FIG. 5 is a graph plot of density (g/cm$^3$) along the horizontal axis against air permeability, in terms of liters of air per second per square meter (at 74 Pascals of pressure, with a correction factor as shown on the graph) to convert to air permeability as a function of surface area per square meter per second) along the vertical axis of commercially available insulation, plywood sheeting, and gypsum board.

Figure 6:
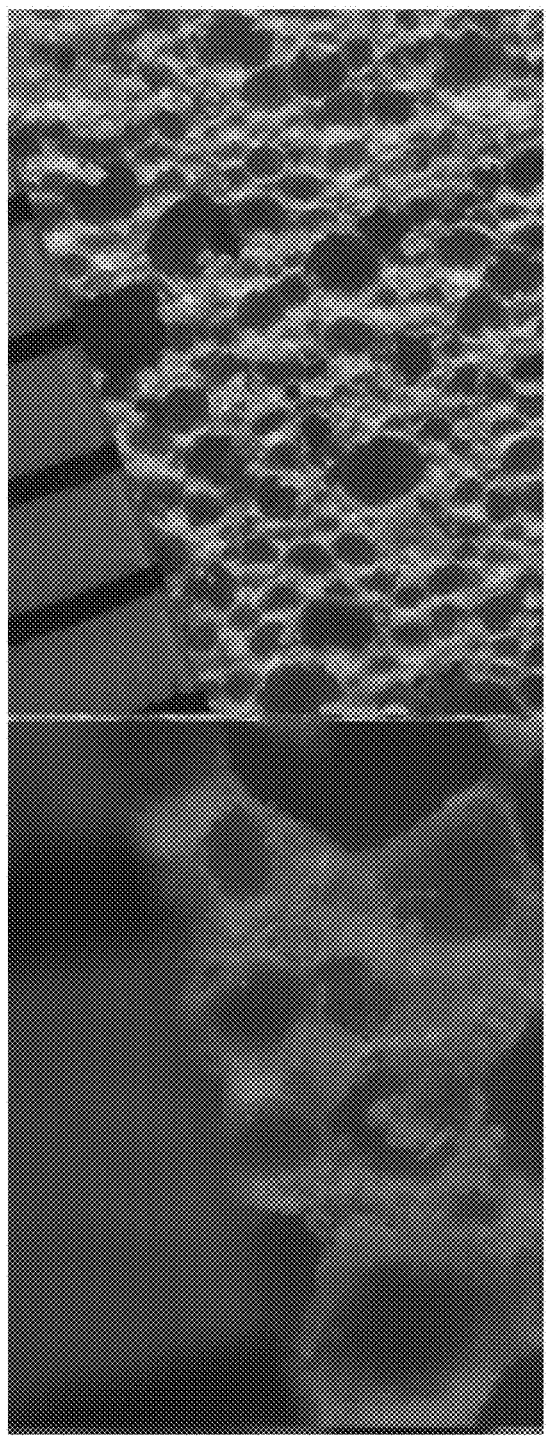
FIG. 6 is a set of microphotographs of an exemplary light weight cementitious foam composition of the present invention, wherein the right photo shows closed cell bubbles that are less than one mm (as indicated by the markings which are spaced 1 mm apart), and wherein the left photo is a higher magnification of the closed cell bubbles wherein the matrix of bubbles are seen to be highly distinct, with minimal material between the closed pores.

FIG. 6 is a set of microphotographs of an exemplary light weight cementitious foam composition of the present invention. As shown in the, right photo, the closed cell bubbles are significantly less than one mm (as indicated by the markings which are spaced 1 mm apart). As shown in the left photo, taken at a higher magnification, the closed cell bubbles are highly distinct and separated, with the matrix of material between the closed pores being minimal, and suggested the ability of the present invention to achieve high porosity and thus low density with the ability to obtain high insulative values and strength due to the closed structure.

Surfactant (TAMOL™ 731 DP), an SRA (hexylene glycol or "HG"), a water repellent (e.g., disodium succinate available from Hycrete Technologies, LLC, New Jersey, under the trade name HYCRETE DSS, and, alternatively, fatty acids combined with SRA), calcium nitrite (e.g., available from Grace Construction Products under the trade name DCI®), a viscosity modifying agent (e.g., methyl cellulose), microfibers of different lengths (e.g., 1.5 and 0.8 mm), fine particulates, and water. The cementitious slurry component was made using a borate, a PC Surfactant (TAMOL™ 731 DP), an SRA (e.g., HG), microfibers, macrofibers (commercially available from Grace Construction Products under the trade name STRUX®), water, and various cements, as summarized below in Table 4A.

TABLE 4A

| | Mix # | | | | |
|---|---|---|---|---|---|
| | P14 1.9 W/C | P16 1.31 W/C | P17 1.21 W/C | P-25 Hycrete DSS/Macro Fibers | P-26 HG/Fatty Acids |
| Foaming Component | 53.99% | 43.19% | 40.87% | 52.99% | 58.24% |
| PVOH | 3.91% | 3.82% | | 3.99% | 3.55% |
| PVOH (87.5-98% hydrolyzed) | | | 3.52% | | |
| PC Surfactant (TAMOL ™ 731 DP) | 0.63% | 0.78% | 0.81% | 0.64% | 0.71% |
| SRA (HG) | 1.25% | 1.55% | 1.62% | 1.28% | |
| Water Repellant | | | | 1.44% | |
| 75% HG/25% Fatty Acids | | | | | 1.14% |
| Calcium Nitrite | 4.69% | 5.81% | 6.06% | 4.79% | 4.26% |
| VMA (Methyl Cellulose) | 0.06% | 0.08% | 0.08% | 0.05% | 0.06% |
| Microfibers 1.5 mm PE | 0.16% | 0.19% | 0.20% | 0.16% | 0.14% |
| Microfibers 0.8 mm PE | 0.10% | 0.13% | 0.13% | 0.11% | 0.09% |
| Fine Particulate | | | | | 3.31% |
| Water | 43.19% | 30.83% | 28.45% | 40.53% | 44.98% |
| Cement Slurry Component | 46.00% | 56.81% | 59.14% | 47.03% | 41.75% |
| Barium Metaborate | 0.63% | 0.61% | 0.57% | 0.64% | 0.57% |
| PC Surfactant (TAMOL ™ 731 DP) | 0.31% | 0.39% | 0.40% | 0.32% | 0.28% |
| SRA (HG) | 0.94% | 1.16% | 1.21% | 0.64% | 0.85% |
| Microfibers 8 mm PP | 0.47% | 0.58% | 0.61% | 0.37% | 0.43% |
| Microfibers 5 mm PP | 0.47% | 0.58% | 0.61% | 0.27% | 0.43% |
| Macrofibers (Strux ® 85/50) | | | | 1.06% | |
| Water | 11.89% | 14.73% | 15.35% | 11.81% | 10.79% |
| White cement | 15.65% | 19.38% | 20.19% | 15.96% | 14.20% |
| Denka Colloidal super cement | 7.82% | 9.69% | 10.10% | 7.98% | 7.10% |
| Denka CSA | 7.82% | 9.69% | 10.10% | 7.98% | 7.10% |
| Cement Slurry-to-Foam Component by Mass | 0.85 | 1.32 | 1.45 | 0.89 | 0.72 |
| Total W/C (water/cement) | 1.899 | 1.314 | 1.223 | 1.899 | 1.846 |
| Final Dry Density (g/cm$^3$) | 0.105 | 0.212 | 0.694 | 0.096 | 0.077 |
| Final Dry Density (g/cm$^3$) | 0.052 | 0.125 | 0.431 | 0.052 | 0.047 |
| Comp. Strength dry (MPa) | 0.114 | 0.742 | 2.579 | 0.080 | 0.079 |
| Strength-to-density Ratio(metric) | 2.18 | 5.95 | 5.99 | 1.55 | 1.67 |

Exemplary cementitious foams, articles, and structures of the invention will have closed cell air void bubbles that are on the average less than 200 microns diameter.

The lower density materials have the advantage of having more air and thus a lower cost, where air impermeability is not needed, and as shown in Example 1 have much higher strength than inorganic foams made without using the teachings of this invention.

EXAMPLE 5

Three cementitious foam slurry samples were made using water/cement (W/C) ratios of 1.9, 1.31, and 1.21, respectively, for sample numbers P14, P16, and P17. The foaming component was made using a foam stabilizer (PVOH), a PC The vapor transmission of the cementitious foam slurries, as a function of density and thickness, was measured (ASTM E 96—wet method) and given in Table 4B.

TABLE 4B

| | | Density (g/cm$^3$) | Thickness (cm) | Permeance (perms) |
|---|---|---|---|---|
| | Mix Designs | | | |
| P14 | First sample | 0.059 | 5.08 cm | 1.92 |
| P14 | Second sample | 0.059 | 5.08 | 1.7 |
| P25 | First sample | 0.055 | 5.08 | 1.96 |
| P25 | Second Sample | 0.055 | 5.08 | 1.78 |

TABLE 4B-continued

| | | Density (g/cm³) | Thickness (cm) | Permeance (perms) |
|---|---|---|---|---|
| P16 | First sample | 0.130 | 5.08 | 1.68 |
| P16 | Second Sample | 0.130 | 5.08 | 1.7 |
| P17 | First sample | 0.361 | 5.08 | 0.82 |
| P17 | Second Sample | 0.361 | 5.08 | 0.83 |
| P14 | 4" Base | 0.060 | 10.16 cm | 1.07 |
| P25 | 4" Hycrete | 0.056 | 10.16 | 0.94 |
| P26 | First Sample | 0.043 | 5.08 | 1.8656 |
| P26 | Second Sample Competitor | 0.043 | 5.08 | 1.79 |
| | Regular Gypsum Board | 0.769 | 5.08 | 6.75 |
| | Dens Glass Gold ® Board | 0.881 | 5.08 | 5.75 |
| | Exp. Polystyrene Rigid Board | 0.029 | 5.08 | 0.23 |
| | ccSPF | 0.032 | 5.08 | 0.95 |

Even at low densities, the material having 5 cm thickness is able to meet the criterion for low vapor permeance (less than 2 perms).

Figure 7:
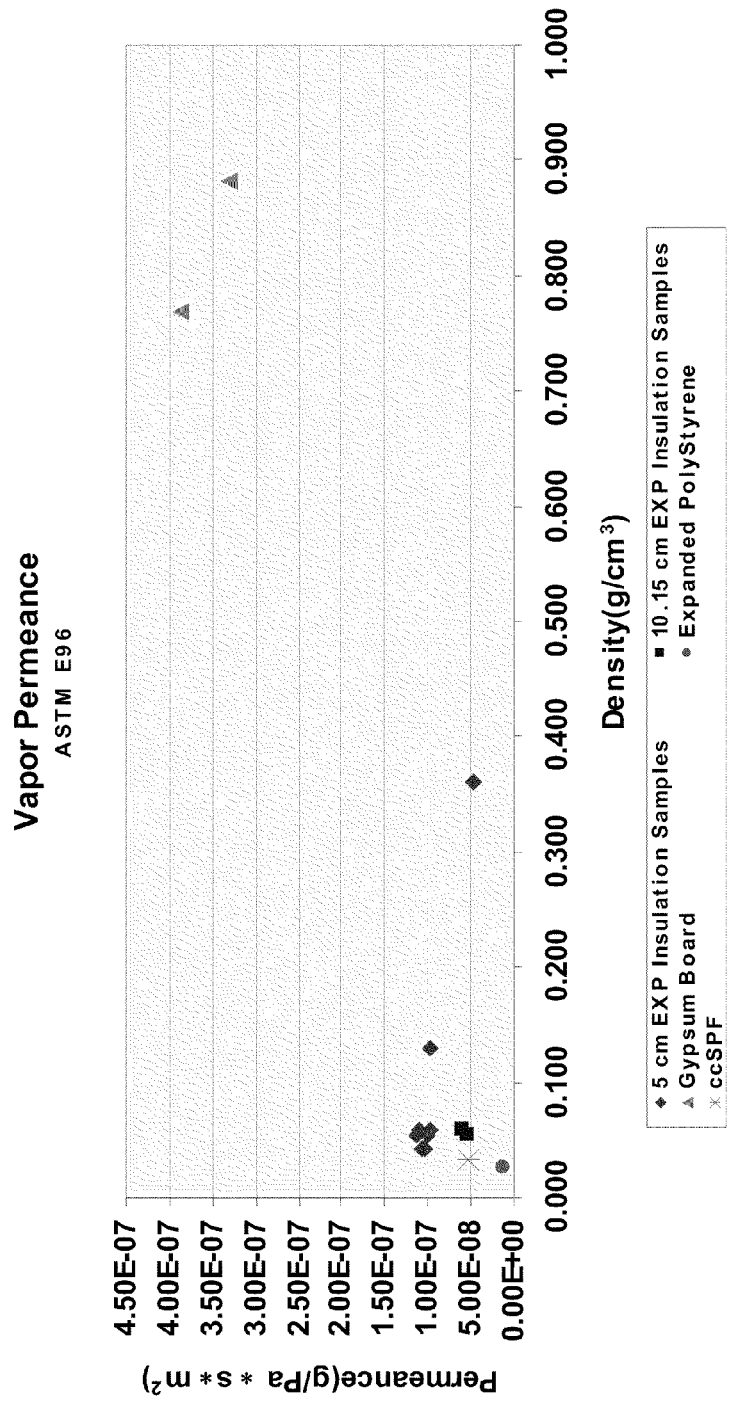
FIG. 7 is a graphic plot of density (horizontal axis) against vapor permeance (vertical axis) of commercially available insulation board, gypsum board, and expanded polystyrene.

FIG. 7 provides a graphic illustration of this data and shows values for another inorganic material (gypsum board), closed cell polyurethane, and expanded polystyrene tested in accordance with ASTM E 96. Densities of the materials are plotted against permeance values.

EXAMPLE 6

One potential use of this material is as an insulating material in roofing applications. Table 5 summarizes strength and k values for material of this invention in comparison to a commercial cementitious roofing insulation product that was made with expanded vermiculite aggregate. At similar strengths and densities the material of this invention has a k value that is reduced by at least a factor of 1.5 to 2.

TABLE 5

| Roof Deck Cementitious Insulation System | P37 |
|---|---|
| Foaming Component | 44.38% |
| PVOH | 2.76% |
| PC Surfactant (TAMOL ™ 731 DP) | 0.50% |
| SRA/Fatty Acids (75% HG/25% Fatty Acids) | 0.88% |
| Calcium salt (calcium nitrite) | 3.30% |
| VMA (Methyl Cellulose) | 0.05% |
| Microfibers 1.5 mm PE | 0.10% |
| Microfibers .8 mm PE | 0.06% |
| Fine Particulates | 1.77% |
| Water | 34.97% |
| Cement Slurry Component | 55.66% |
| Barium Metaborate | 0.35% |
| PC Surfactant (TAMOL ™ 731 DP) | 0.38% |
| SRA (HG) | 0.94% |
| Microfibers 5 mm PP | 0.94% |
| Water | 14.61% |
| White Cement | 28.83% |
| Expansion Agent (Denka CSA) | 9.61% |
| Cement Slurry-to-Foam Component by Mass | 1.25 |
| Total W/C (water/cement) ratio | 1.31 |
| Initial Wet Density (g/cm³) | 0.606 |
| Final Dry Density (g/cm³) | 0.377 |
| Compressive Strength dry (MPa) | 1.014 |
| Strength-to-density Ratio(metric) | 2.69 |
| Measured K-Value (W/m °K) | 0.0501 |

Figure 8:
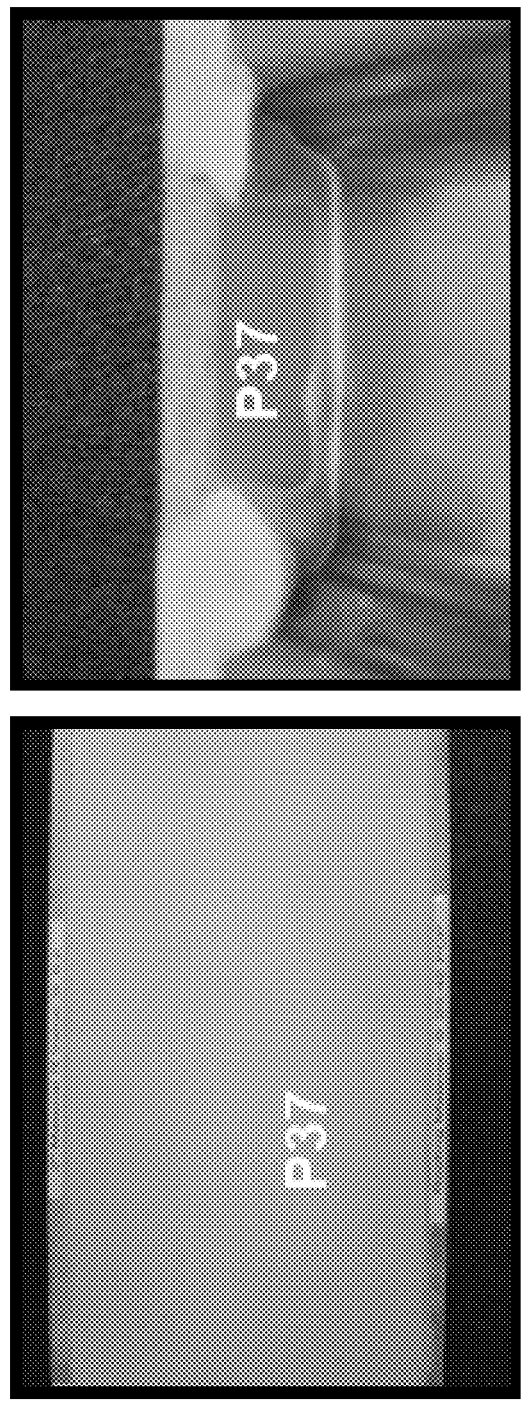
FIG. 8 is a set of photographs of a sample of cementitious foam P37 of the present invention (left photo) and the use of this material in a corrugated steel deck (right photo)

FIG. 8 is a set of photographs illustrating sample cementitious foam P37 of the present invention (left photo) and its use with a corrugated steel deck (right photo). The backside shown in the right photo demonstrates sealing of the gaps between the form and the decking material; this would eliminate the need to seal against excess loss of the material through the cracks.

EXAMPLE 7

The materials in this invention can be incorporated into boards that can have a mesh, membrane, or metallic foil on one or both sides (or the mesh can be located internally inside the board foam matrix). Cementitious foam composition sample (P35), as summarized in Table 6, was cast against aluminum foil, and another foam composition sample (P35), from Table 6 was cast against a polymeric mesh.

TABLE 6

| Sheathing Panel | P35 |
|---|---|
| Foaming Component | 42.41% |
| PC Surfactant (TAMOL ™ 731 DP) | 0.51% |
| PVOH | 2.84% |
| 75% HG/25% Fatty Acids | 0.91% |
| Calcium Salt (calcium nitrite) | 3.40% |
| VMA (Methyl Cellulose) | 0.05% |
| Microfibers 1.5 mm PE | 0.10% |
| Microfibers 0.8 mm PE | 0.06% |
| Fine Particulates | 1.82% |
| Water | 32.72% |
| Cement Slurry Component | 57.59% |
| Barium Metaborate | 0.36% |
| PC Surfactant (TAMOL ™ 731 DP) | 0.40% |
| SRA (HG) | 0.97% |
| Microfibers 5 mm PP | 0.97% |
| Water | 15.12% |
| White Cement | 29.83% |
| Type I-II Grey Cement | |
| Expansion Agent (Denka CSA) | 9.94% |
| Cement Slurry-to-Foam Component by Mass | 1.36 |
| Total W/C (water/cement) ratio | 1.22 |
| Initial Wet Density (g/cm³) | 0.769 |
| Final Dry Density (g/cm³) | 0.481 |

Figure 9:
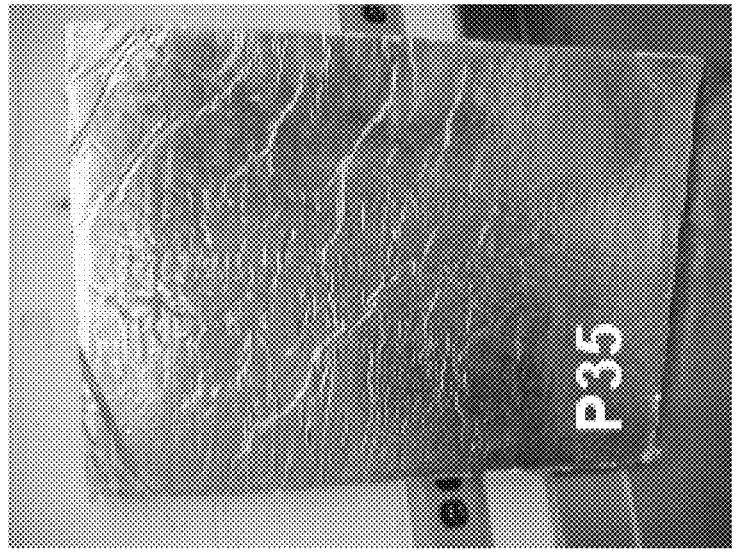
FIG. 9 is a set of photographs of exemplary laminates of the invention wherein, as shown in the left photo, a sample cementitious foam P35 was cast against an aluminum foil, and, as shown in the right photo, the aluminum did not corrode due to the presence of calcium nitrite.
Figure 9:
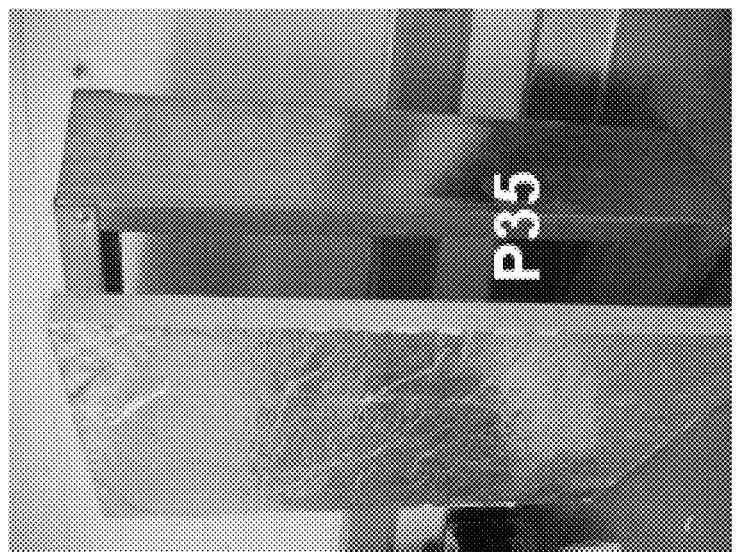

FIG. 9 contains two photographs demonstrating good adhesion of cementitious sample P35 cast against aluminum foil, as shown in the left photo. As shown in the right photo, the aluminum was not corroded by the effect of high pH, and this lack of corrosion was due to the use of calcium nitrite (a corrosion inhibitor) in the sample formulation P35.

Figure 10:
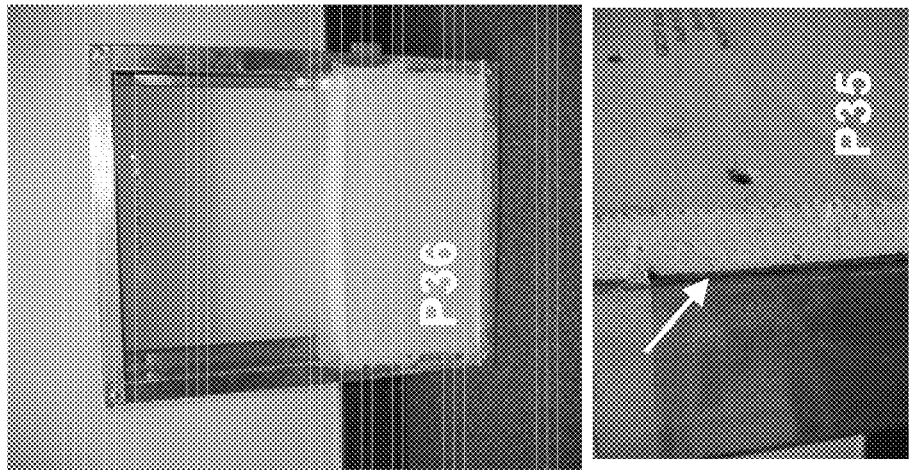
FIG. 10 is a set of four photographs, the lower left photo depicting a (PRIOR ART) commercial gypsum dry wall product (commercially available under the trade name Dens Glass Gold®) fastened against a frame using standard fasteners, the upper left and lower right photos depicting exemplary cementitious foam boards P35 of the present invention which was fastened to a steel stud wall using screws, and the upper right photo depicting an exemplary cementitious foam sample P36 of the present invention that was poured to fill a steel stud.
Figure 10:
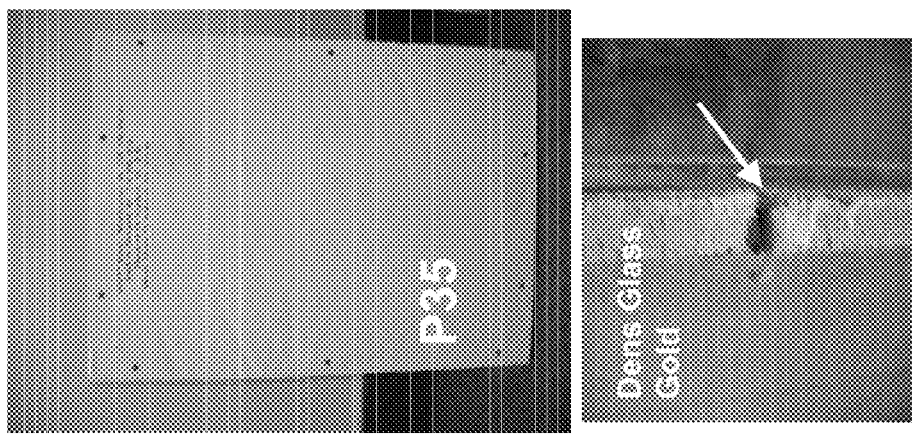

FIG. 10 is a set of four photographs of panels that have been either attached or poured against steel studs. The lower left photo depicts a (PRIOR ART) commercial gypsum dry wall product (commercially available under the trade name Dens Glass Gold®) fastened against a frame using standard fasteners (e.g., screws). The arrow in the lower left photo points to the collapse the gypsum matrix due to the effect of the fastener. The upper left and lower right photos depict exemplary cementitious foam boards P35 of the present invention which were cast into board shape and then fastened to a steel stud wall using standard fasteners (screws). The arrow in the lower right photo points to the cement matrix surrounding the fastener and shows that this surrounding area was not damaged due to the effect of the fastener. The upper right photo depicts an exemplary cementitious foam sample P36 of the present invention that was poured to fill a steel stud.

To decrease drying times, these materials were dried at 60 degrees Celsius, a temperature that was significantly higher than those at which typical organic foams are dimensionally stable. This temperature is below that typically used in autoclaving of cellular concretes. Drying temperatures above 130 degrees Celsius were shown to work.

EXAMPLE 8

Table 7 gives the composition of a mixture in which all the ingredients were mixed moved through a pump and pressurized with air as described in U.S. Pat. No. 6,780,230 B2. Solidification times were decreased by mixing barium borate into the spray. The initial wet densities, before and after the borate addition, as well as the dry density of the sprayed mixtures, are provided in Table 7.

TABLE 7

| | P32 Sprayed/ Hycrete/ Sodium Tetra Borate | P33 Sprayed/Sodium Bicarbonate & Tetra Borate, Barium Metaborate |
|---|---|---|
| Foam Stabilizer (PVOH) | 4.08% | 3.77% |
| PC Surfactant (TAMOL ™ 731 DP) | 1.16% | 1.35% |
| SRA (HG) | 1.56% | 1.35% |
| Calcium salt (calcium nitrite) | 4.72% | 4.72% |
| VMA (Methyl Cellulose) | 0.10% | 0.10% |
| Microfibers 1.5 mm PE | 0.13% | 0.08% |
| Microfibers 0.8 mm PE | 0.09% | 0.08% |
| Water | 54.98% | 55.52% |
| Sodium Tetraborate (2.5% solution) | 0.05% | |
| Barium Metaborate (7.5% Solution) | | 0.13% |
| Sodium Tetraborate/bicarbonate (2.5%/15% solution) | | 0.13% |
| Microfibers 8 mm pp | 0.19% | |
| Microfibers 5 mm pp | 0.19% | |
| Water Repellent (Hycrete DSS) | 0.94% | 0.94% |
| White Cement | 15.90% | 15.90% |
| Denka Colloidal super cement | 7.95% | 7.95% |
| Expansion Agent (Denka CSA) | 7.95% | 7.95% |
| Initial Density (g/cm$^3$) | 0.221 | 0.292 |
| Dry Density (g/cm$^3$) | 0.121 | 0.181 |
| Depth Sprayed on Wall Cavity (cm) | 3.81 | 11.43 |

EXAMPLE 9

A desirable property of foamed insulations used in areas subject to moisture is to have a reduced water absorption coefficient. Table 8 shows that the foam can be made more water repellent by adding hydrophobic admixtures to either the foam component or cement slurry component. It was observed that the fatty acid addition to the foam component enhanced the stability of the foam, and hence this was the preferred means of addition. A 20% solution of di-sodium salt of tetrapropenyl butandediodic acid could not be added to the foam component because it would react with the calcium nitrite. The absorption by volume and average absorption is provided in Table 8A, while the percentage absorption by mass is provided in Table 8B.

TABLE 8A

| Mix # | Density .048-.064 g/cm$^3$ | Absorption by volume (g/cm3) | Average Absorption (g/cm3) |
|---|---|---|---|
| P14 | First sample | 0.00698 | See below |
| P14 | Second sample | 0.00862 | 0.00780 |
| P25 | First sample | 0.00494 | See below |
| P25 | Second sample | 0.00545 | 0.00520 |
| P26 | First sample | 0.00379 | See below |
| P26 | Second sample | 0.00333 | 0.00356 |

TABLE 8B

| Mix # | Density | % Absorption by Mass |
|---|---|---|
| P14 | .052 g/cm$^3$ | 8.76% |
| P25 | .052 g/cm$^3$ | 4.77% |
| P26 | .047 g/cm$^3$ | 5.71% |

EXAMPLE 10

Encapsulation of the liquid components as taught in U.S. Pat. No. 6,648,962 B2 allows for some or all the dry components to be premixed, requiring only water to produce the foamed cementitious material. Table 9 provides the composition of the dried material as well as wet and dry densities. Cement is introduced in the form of particles which involve hydrating cement with calcium nitrite, allowing particles to dry, crushing the particles, and then coating the crushed particles with a coating comprising an SRA (hexylene glycol) and fatty acid water repellents (e.g., combination of oleic acid and stearic acid; or salt form thereof).

TABLE 9

| Encapsulated Nitrites/Glycol/Fatty Acids One Component | P40 |
|---|---|
| Liquid | 59.33% |
| Water | 59.33% |
| Solid Components | 40.69% |
| PC Surfactant (TAMOL ™ 731 DP) | 0.51% |
| Foam Stabilizer (PVOH) | 3.99% |
| VMA (Methyl Cellulose) | 0.06% |
| Microfibers 1.5 mm PE | 0.16% |
| Microfibers 0.8 mm PE | 0.10% |
| Barium Metaborate | 0.64% |
| PC Surfactant (TAMOL ™ 731 DP) | 0.32% |
| SRA (HG) | 0.96% |
| Microfibers 5 mm pp | 0.96% |
| White Cement | 16.59% |
| Encapsulated Cement (comprising 13.2% Calcium Nitrite in cement, crushed then coated with 7.9% SRA (HG) & Fatty Acids (oleic and stearic) | 13.08% |
| Expansive Agent (Denka CSA) | 3.19% |
| Solid-to-Liquids by Mass | 0.69 |
| Total W/C (water/cement) ratio | 1.89 |
| Final Dry Density (g/cm$^3$) | 0.212 |
| Final Dry Density (g/cm$^3$) | 0.115 |

EXAMPLE 11

Cementitious foam compositions of the present invention can be combined with conventional aggregates to form a lightweight concrete. It is believed that the final density of such lightweight concrete will be easier to control, and the thermal conductivity (k) will be lower than what has typically been reported in the literature. Table 10 gives an example illustrating this.

TABLE 10

| Lightweight Foamed Concrete | P34 |
|---|---|
| PC Surfactant (TAMOL ™ 731 DP) | 0.79% |
| PVOH | 0.42% |
| SRA (HG) | 1.06% |
| Calcium salt (calcium nitrite) | 3.96% |
| VMA (Methyl Cellulose) | 0.03% |
| Microfibers 1.5 mm PE | 0.13% |

TABLE 10-continued

| Lightweight Foamed Concrete | P34 |
|---|---|
| Microfibers 0.8 mm PE | 0.08% |
| Water | 12.75% |
| Barium Metaborate | 0.07% |
| White Cement | 13.19% |
| Denka Colloidal super cement | 6.60% |
| Expansive Agent Denka CSA | 6.60% |
| ⅜" Coarse Aggregate | 34.76% |
| Sand | 19.56% |
| Dry Density(g/cm$^3$) | 1.82 |
| Measured K-Value (W/m ° K) | 0.1862 |

EXAMPLE 12

While it may be desirable to use white cements for aesthetic reasons, this example demonstrates that cementitious foam compositions of the present invention may use grey cement as well. Table 11 illustrates graphically that the compositions work well with an ordinary gray cement (ASTM C 150 Type 1, 2).

TABLE 11

| Samples with Type I-II Grey Cement | P38 25% CSA | P39 10% CSA |
|---|---|---|
| Foaming Component | 57.75% | 44.85% |
| PC Surfactant (TAMOL ™ 731 DP) | 0.57% | 0.76% |
| Foam Stabilizer (PVOH) | 3.59% | 3.33% |
| 75% HG/25% Fatty Acids | 0.86% | 1.39% |
| Calcium nitrite (calcium nitrite) | 4.31% | 5.74% |
| VMA (Methyl Cellulose) | 0.06% | 0.08% |
| Microfibers 1.5 mm PE | 0.14% | 0.14% |
| Microfibers 0.8 mm PE | 0.09% | 0.09% |
| Fine Particulates | 3.59% | 2.90% |
| Water | 44.54% | 30.42% |
| Cement Slurry Component | 42.23% | 55.14% |
| Barium Metaborate | 0.57% | 0.54% |
| PC Surfactant (TAMOL ™ 731 DP) | 0.29% | 0.38% |
| SRA (HG) | 0.86% | 0.72% |
| Microfibers 5 mm PP | 0.86% | 0.72% |
| Water | 10.92% | 14.54% |
| Type I-II Grey Cement | 21.55% | 34.42% |
| Expansion Agent (Denka CSA) | 7.18% | 3.82% |
| Cement Slurry-to-Foam Component by Mass | 0.73 | 1.23 |
| Total W/C (water/cement) ratio | 1.83 | 1.31 |
| Initial wet Density (g/cm$^3$) | 0.102 | 0.212 |
| Final Dry Density (g/cm$^3$) | 0.047 | 0.112 |

EXAMPLE 13

Polyvinyl alcohol (PVOH) is commercially available at varying levels of hydrolysis. As shown in Table 12, there can be a significant reduction in water absorption with a more hydrolyzed PVOH. However, a higher density cementitious foam product may be obtained by using PVOH with higher levels of hydrolysis, and this would be more appropriate if higher strength and enhanced water resistance are needed.

The system components for two cementitious foam slurry samples are provided in Table 12A, and the percentage moisture absorption properties of these samples are provided in Table 12B.

TABLE 12A

| | P29 (99% Hydrolyzed PVOH) | P17 (87.5-89% Hydrolyzed PVOH) 1.21 W/C |
|---|---|---|
| Foaming Component | 54.09% | 40.87% |
| PC Surfactant (TAMOL ™ 731 DP) | 0.62% | 0.81% |
| Foam Stabilizer (PVOH) | | 3.52% |
| PVOH 99% Hydrolyzed | 3.90% | |
| SRA (HG) | 1.25% | 1.62% |
| Calcium salt (calcium nitrite) | 4.68% | 6.06% |
| VMA (Methyl Cellulose) | 0.31% | 0.08% |
| Microfibers 1.5 mm PE | 0.16% | 0.20% |
| Microfibers 0.8 mm PE | 0.09% | 0.13% |
| Water | 43.08% | 28.45% |
| Cement Slurry Component | 45.90% | 59.14% |
| Barium Metaborate | 0.62% | 0.57% |
| PC Surfactant (TAMOL ™ 731 DP) | 0.31% | 0.40% |
| SRA (HG) | 0.94% | 1.21% |
| Microfibers 8 mm PP | 0.47% | 0.61% |
| Microfibers 5 mm PP | 0.47% | 0.61% |
| Water | 11.86% | 15.35% |
| White Cement | 15.61% | 20.19% |
| Denka Colloidal super cement | 7.81% | 10.10% |
| Denka CSA (expansion) | 7.81% | 10.10% |
| Cement Slurry-to-Foam Component by Mass | 0.85 | 1.45 |
| Total W/C (water/cement) ratio | 1.900 | 1.223 |
| Initial Wet Density (g/cm$^3$) | 0.661 | 0.694 |
| Final Dry Density (g/cm$^3$) | 0.403 | 0.431 |
| Compressive Strength dry (MPa) | 1.207 | 2.579 |
| Strength-to-density Ratio (metric) | 2.99 | 5.99 |

TABLE 12B

| Mix # | | % Absorption by Mass |
|---|---|---|
| P17 | .4 g/cm3 Base | 7.11% |
| P29 | .4 g/cm3 99% Hydrolysis PVOH | 2.58% |

EXAMPLE 14

Cementitious foam compositions of the present invention can be used with lightweight aggregate additions. An example with expanded polystyrene balls is given in Table 13. Thermal properties were not improved when added to the low density foam, but there was an increase in strength. The present inventors suspect that expanded polystyrene can be used in various forms, such as shredded polystyrene.

TABLE 13

| | P27 Polystyrene Beads | P14 1.9 W/C |
|---|---|---|
| Foaming Component | 51.41% | 53.99% |
| PC Surfactant (TAMOL ™ 731 DP) | 0.62% | 0.63% |
| PVOH | 3.87% | 3.91% |
| SRA (HG) | 1.24% | 1.25% |
| Calcium Nitrite | 5.16% | 4.69% |
| VMA (Methyl Cellulose) | 0.05% | 0.06% |
| Microfibers 1.5 mm PE | 0.15% | 0.16% |
| Microfibers 0.8 mm PE | 0.08% | 0.10% |
| Water | 40.24% | 43.19% |
| Cement Slurry Component | 48.60% | 46.00% |
| Barium Metaborate | 0.62% | 0.63% |
| PC Surfactant (TAMOL ™ 731 DP) | 0.31% | 0.31% |
| SRA (HG) | 0.31% | 0.94% |
| Microfibers 8 mm PP | 0.31% | 0.47% |
| Microfibers 5 mm PP | | 0.47% |
| Polystyrene Beads | 4.64% | |
| Water | 11.45% | 11.89% |

TABLE 13-continued

|  | P27 Polystyrene Beads 51.41% | P14 1.9 W/C 53.99% |
|---|---|---|
| Foaming Component | | |
| White Cement | 15.48% | 15.65% |
| Denka Colloidal super cement | 7.74% | 7.82% |
| Denka CSA (expansion agent) | 7.74% | 7.82% |
| Cement Slurry-to-Foam Component by Mass | 0.95 | 0.85 |
| Total W/C (water/cement) ratio | 1.83 | 1.899 |
| Initial Wet Density (g/cm$^3$) | 0.107 | 0.105 |
| Final Dry Density (g/cm$^3$) | 0.060 | 0.052 |
| Compressive Strength dry (MPa) | 0.517 | 0.114 |
| Strength-to-density Ratio (metric) | 8.56 | 2.18 |

EXAMPLE 15

Figure 11:
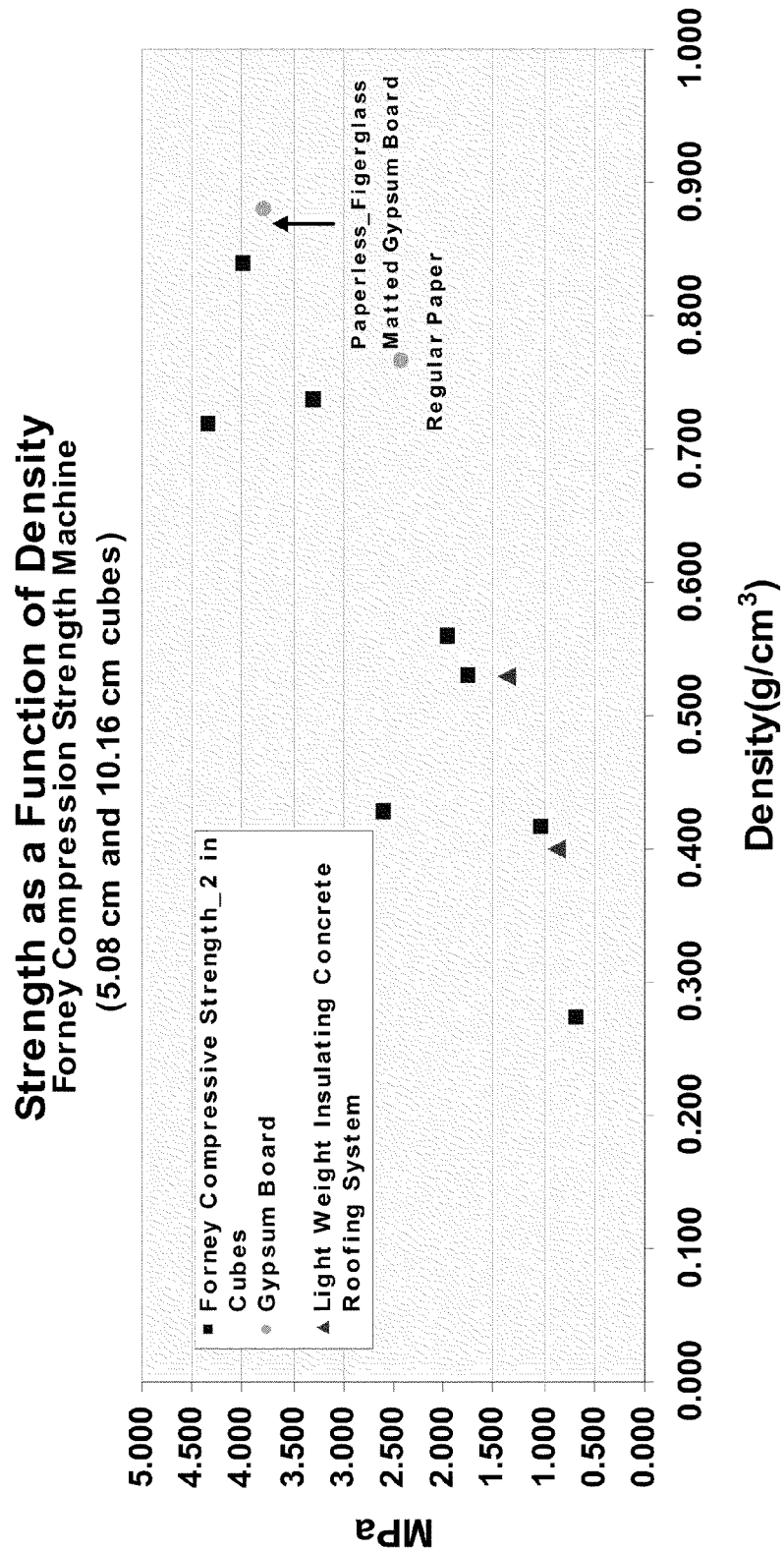
FIG. 11 is a graph plot of the density (horizontal axis) against compressive strength (vertical axis) of commercial (PRIOR ART) gypsum board materials.

The strength data for the various examples relative to published values for several competitive technologies are shown in FIG. 11, which sets forth the density (along horizontal axis) of these commercial (prior art) materials against their compressive strength (along vertical axis). In contrast, the cementitious foam materials of the present invention show an increase in strength-to-density over that found in prior art competitive technologies.

EXAMPLE 16

The effect of calcium chloride on properties was examined and compared to other calcium salts. U.S. Pat. No. 4731389 disclosed the use of calcium chloride in Portland cement. Table 14 compares various cementitious foams.

TABLE 14

|  | P41 No Calcium Salt | P42 Calcium Chloride | P43 Calcium Nitrate | P44 Calcium Nitrite |
|---|---|---|---|---|
| Foaming Component | 45.7% | 46.5% | 46.5% | 46.5% |
| PVOH | 3.50% | 3.45% | 3.45% | 3.45% |
| PC Surfactant (TAMOL ™ 731 DP) | 0.56% | 0.55% | 0.55% | 0.55% |
| 75% HG/25% Fatty Acids | 0.62% | 0.61% | 0.61% | 0.61% |
| Calcium Chloride | | 1.41% | | |
| Calcium Nitrite | | | | 1.41% |
| Calcium Nitrate | | | 1.41% | |
| VMA (Methyl Cellulose) | 0.05% | 0.05% | 0.05% | 0.05% |
| Microfibers 1.5 mm PE | 0.14% | 0.14% | 0.14% | 0.14% |
| Microfibers 0.8 mm PE | 0.09% | 0.09% | 0.09% | 0.09% |
| Fine Particulates | 1.87% | 1.84% | 1.84% | 1.84% |
| Water | 38.87% | 38.32% | 38.32% | 38.32% |
| Cement Slurry Component | 54.3% | 53.6% | 53.6% | 53.6% |
| Barium Metaborate | 0.56% | 0.56% | 0.56% | 0.56% |
| PC Surfactant (TAMOL ™ 731 DP) | 0.37% | 0.37% | 0.37% | 0.37% |
| SRA (HG) | 0.93% | 0.93% | 0.93% | 0.93% |
| Microfibers 5 mm PP | 0.93% | 0.93% | 0.93% | 0.93% |
| Water | 14.18% | 13.98% | 13.98% | 13.98% |
| White Cement | 27.99% | 27.59% | 27.59% | 27.59% |
| Denka CSA (expansion agent) | 9.33% | 9.20% | 9.20% | 9.20% |
| Cement Slurry-to-Foam Component by Mass | 1.19 | 1.15 | 1.15 | 1.15 |
| Total Water/Cement ratio | 1.36 | 1.36 | 1.36 | 1.36 |
| Initial Wet Density (g/cm$^3$) | 0.742 | 0.333 | 0.237 | 0.186 |
| Final Dry Density (g/cm$^3$) | 0.505 | 0.212 | 0.144 | 0.093 |
| Measured K-Value (W/m ° K) | 0.057 | 0.039 | 0.032 | 0.032 |
| Strength at 10% deformation (MPa) | 2.104 | 0.514 | 0.129 | 0.098 |

Calcium chloride does impart a significant improvement in foam in comparison to foam that does not contain this material. This is evidence by the lower density and k value for sample P42 which contained calcium chloride in comparison to (control) sample P41 which did not contain calcium chloride. However, the addition of a corrosion inhibiting calcium nitrite, as shown in sample P43, resulted in a cement sample having significantly lower density (56% decrease) and k value in comparison to P41 and P42. This was also true for sample P44, which contained calcium nitrate, and which was less corrosive than samples containing calcium chloride rather than calcium nitrite. The same k value at a higher density for sample P43 compared to sample P44 suggested that samples containing calcium nitrite will have higher strength without sacrificing insulating properties. The samples containing the calcium nitrite also foamed more quickly, and this property is seen to be advantageous where speedy application is required. The improvements afforded by using nitrite and/or nitrate are substantial in comparison to calcium chloride.

EXAMPLE 17

The effect of adding glycerin to the cementitious foam compositions of the invention was examined. Table 15 graphically illustrates thermal properties of a low density sample (P45) and intermediate density samples (P46). These foam samples had slightly lower to comparable thermal properties in comparison to foam samples that did not contain glycerin. The present inventors concluded that the optional use of glycerin imparts flexibility to the foams as they harden over a slightly longer time. An enhanced skin formed on these examples, and resulted in a smoother surface.

TABLE 15

|  | P45 10% Glycerin on PVOH | P46 10% Glycerin on CaNi | P47-Sodium Gluconate as Complexing agent in cement |
|---|---|---|---|
| Foaming Component | 45.4% | 28.0% | 45.9% |
| PVOH | 3.17% | 2.41% | 3.40% |
| PC Surfactant (TAMOL ™ 731 DP) | 0.51% | 0.60% | 0.55% |
| 75% HG/25% Fatty Acids | 0.76% | 0.54% | 0.61% |
| Glycerin | 0.32% | 0.14% | |
| Calcium Nitrite (Grace DCI ®) | 3.81% | 4.03% | 4.08% |
| VMA Methyl Cellulose | 0.04% | 0.05% | 0.05% |
| Microfibers 1.5 mm PE | 0.13% | 0.11% | 0.12% |
| Microfibers 0.8 mm PE | 0.08% | 0.05% | 0.07% |
| Fine Particulates | 1.59% | 1.49% | 1.82% |
| Water | 35.03% | 18.57% | 35.22% |
| Cement Slurry Component | 54.6% | 72.0% | 54.1% |
| Barium Metaborate | 0.51% | 0.40% | 0.55% |
| Sodium Gluconate | | | 0.02% |
| PC Surfactant (TAMOL ™ 731 DP) | 0.51% | 0.40% | 0.36% |

TABLE 15-continued

|  | P45 10% Glycerin on PVOH | P46 10% Glycerin on CaNi | P47-Sodium Gluconate as Complexing agent in cement |
|---|---|---|---|
| SRA (HG) | 1.14% | 0.99% | 0.91% |
| Microfibers 5 mm PP | 1.14% | 0.99% | 0.91% |
| Water | 13.20% | 19.07% | 14.89% |
| Type I Grey Cement |  |  | 27.33% |
| White Cement | 28.56% | 37.62% |  |
| Denka CSA (expansion agent) | 9.52% | 12.53% | 9.11% |
| Cement Slurry-to-Foam Component by Mass | 1.20 | 2.57 | 1.18 |
| Total W/C (water/cement) ratio | 1.3 | 0.79 | 1.39 |
| Initial Wet Density (g/cm$^3$) | 0.245 | 0.646 | 0.417 |
| Final Dry Density (g/cm$^3$) | 0.160 | 0.540 | 0.261 |
| Measured K-Value (W/m $^\circ$ K) | 0.035 | 0.059 | 0.040 |

EXAMPLE 18

The P47 formulation in Table 15 shows that sodium gluconate can be used as a retarder in the cementitious slurry component for greater workability time in hot weather, without adverse properties on the foam formation. In this example gray cement was used to demonstrate that white cement does not have to be used if appearance is unimportant.

Thus, exemplary cementitious slurry components of the invention may further comprise a gluconate which is operative to retard the cement and thereby confer greater workability.

EXAMPLE 19

Formulation P48 in Table 16 demonstrates that the amount of methyl cellulose can be increased in the foam component. This is advantageous in that it makes it easier to make the foam in a static mixer with air.

TABLE 16

|  | P48 Methyl Cellulose as VMA on cement slurry | P49 Low Cost Design 35% reduction in RMC |
|---|---|---|
| Foaming Component | 45.9% | 41.8% |
| PVOH | 3.40% | 1.75% |
| PC Surfactant (TAMOL ™ 731 DP) | 0.55% | 0.44% |
| 75% HG/25% Fatty Acids | 0.61% | 0.66% |
| Calcium Nitrite (Grace DCI ®) | 4.08% | 2.63% |
| VMA (Methyl Cellulose) |  | 0.04% |
| Microfibers 1.5 mm PE | 0.12% | 0.11% |
| Microfibers .8 mm PE | 0.07% | 0.07% |
| Fine Particulates | 1.82% |  |
| Water | 35.24% | 36.11% |
| Cement Slurry Component | 54.1% | 58.2% |
| Barium Metaborate | 0.55% | 0.22% |
| Methyl Cellulose | 0.02% |  |
| PC Surfactant (TAMOL ™ 731 DP) | 0.36% | 0.22% |
| SRA (HG) | 0.91% | 0.22% |
| Microfibers 5 mm PP | 0.91% | 0.66% |
| Water | 14.89% | 15.32% |
| Type I Grey Cement | 27.33% | 36.11% |
| Denka CSA | 9.11% | 5.47% |
| Cement Slurry-to-Foam Component by Mass | 1.18 | 1.39 |
| Total W/C (water/cement) | 1.39 | 1.29 |
| Initial Wet Density (g/cm$^3$) | 0.212 | 0.194 |
| Final Dry Density (g/cm$^3$) | 0.128 | 0.099 |
| Measured K-Value (W/m $^\circ$ K) | 0.042 | 0.042 |

EXAMPLE 20

Formulation P49 in Table 16 demonstrates that costs can be lowered for low density foams by lowering the PVOH content by substituting a portion of the PVOH with an increased amount of methyl cellulose.

EXAMPLE 21

Foams were produced at low and intermediate densities with either white or gray cement to demonstrate that both can be used in cementitious foam slurry systems of the present invention. Table 17 provides graphic illustration of results for samples P50-P53. The gray cement is less costly and more readily available for applications where appearance is not critical, or where darker cement is preferred. Both cements performed well.

TABLE 17

|  | P50 Low Density White Cement | P51 Low Density Grey Cement | P52 Mid-Density Grey Cement | P53 Mid-Density White Cement |
|---|---|---|---|---|
| Foaming Component | 46.5% | 46.5% | 28.2% | 28.2% |
| PVOH | 3.45% | 3.45% | 2.40% | 2.40% |
| PC Surfactant (TAMOL ™ 731 DP) | 0.55% | 0.55% | 0.60% | 0.60% |
| 75% HG/25% Fatty Acids | 0.61% | 0.61% | 0.87% | 0.87% |
| Calcium Nitrite (DCI ®) | 4.14% | 4.14% | 4.02% | 4.02% |
| VMA (Methyl Cellulose) | 0.05% | 0.05% | 0.06% | 0.06% |
| Microfibers 1.5 mm PE | 0.14% | 0.14% | 0.11% | 0.11% |
| Microfibers 0.8 mm PE | 0.09% | 0.09% | 0.06% | 0.06% |
| Fine Particulates | 1.84% | 1.84% | 1.51% | 1.51% |
| Water | 35.58% | 35.58% | 18.54% | 18.54% |
| Cement Slurry Component | 53.6% | 53.6% | 71.8% | 71.8% |
| Barium Metaborate | 0.56% | 0.56% | 0.40% | 0.40% |
| PC Surfactant (TAMOL ™ 731 DP) | 0.37% | 0.37% | 0.40% | 0.40% |
| SRA (HG) | 0.93% | 0.93% | 1.00% | 1.00% |
| Microfibers 5 mm PP | 0.93% | 0.93% | 1.00% | 1.00% |
| Water | 13.98% | 13.98% | 19.04% | 19.04% |
| Grey Cement Type I |  | 27.59% | 37.49% |  |
| White Cement | 27.59% |  |  | 37.49% |
| Denka CSA | 9.20% | 9.20% | 12.50% | 12.50% |
| Cement Slurry-to-Foam Component by Mass | 1.15 | 1.15 | 2.55 | 2.55 |
| Total W/C (water/cement) | 1.36 | 1.36 | 0.8 | 0.8 |
| Initial Wet Density (g/cm$^3$) | 0.186 | 0.215 | 0.554 | 0.562 |
| Final Dry Density (g/cm$^3$) | 0.093 | 0.104 | 0.439 | 0.447 |
| Measured K-Value (W/m $^\circ$ K) | 0.032 | 0.036 | 0.052 | 0.051 |

EXAMPLE 22

U.S. Pat. No. 4,731,389 disclosed cement foams that were based on both Portland cement and magnesium oxide. However, it was observed that commercial activity of the assignee of this patent appeared to involve primarily the magnesium oxide version.

Table 18 shows several attempts at producing a Portland cement version using the same processes that were purportedly disclosed in this patent. However, the present inventors discovered that only one of five variations worked, and that the material that worked was weaker than cementitious foam compositions taught by the present invention having similar density. Volume stability was not obtained for the sample made in according to the '389 prior patent, because this prior art sample shrunk to half its initial size. Moreover, the present inventors could not obtain consistent results, suggesting a lack of repeatability in this prior art approach.

TABLE 18

| | Attempts to make foam slurry according to U.S. Pat. No. 4,731,389 | | | | |
|---|---|---|---|---|---|
| | attempt 1 | attempt 2 | attempt 3 | attempt 4 | attempt 5 |
| Foaming Component | 50.2% | 50.1% | 50.1% | 49.6% | 49.6% |
| PVOH(11% aqueous solution) | 16.74% | 23.59% | 23.59% | 23.64% | 23.64% |
| Calcium Chloride | 2.51% | 3.53% | 3.53% | 3.54% | 3.54% |
| Precipitated Calcium Carbonate | 2.51% | 0.60% | 0.60% | 0.61% | 0.61% |
| 1,3-butylene glycol | 3.35% | 4.72% | 4.72% | 4.04% | 4.04% |
| Water | 25.10% | 17.69% | 17.69% | 17.73% | 17.73% |
| Cement Slurry Component | 49.8% | 49.9% | 49.9% | 50.4% | 50.4% |
| Portland Cement Type I | 25.10% | 21.87% | 21.87% | 21.92% | 21.92% |
| Precipitated Calcium Carbonate | 1.67% | 1.41% | 1.41% | 1.41% | 1.41% |
| Sodium Metaborate (8 mol) | 2.51% | 2.82% | 2.82% | | |
| Barium Metaborate | | | | 3.28% | 3.28% |
| Glyoxal | 1.67% | 1.90% | 1.90% | 1.90% | 1.90% |
| e-Caprolactam | 0.84% | 0.95% | 0.95% | 0.95% | 0.95% |
| Indopol L-14 polybutene polymer | 0.84% | 0.95% | 0.95% | 0.95% | 0.95% |
| NORLIG ™ 41N | 0.42% | 0.95% | 0.95% | 0.95% | 0.95% |
| Water | 16.74% | 19.01% | 19.01% | 19.06% | 19.06% |
| Cement Slurry-to-Foam Component by Mass | 0.99 | 1.00 | 1.00 | 1.02 | 1.02 |
| Total W/C (water/cement) | 1.80 | 1.89 | 1.89 | 1.86 | 1.86 |
| Initial Wet Density (g/cm$^3$) | | 0.160 | | 0.157 | |
| Final Dry Density (g/cm$^3$) | | 0.056 | | 0.067 | |

EXAMPLE 23

U.S. Pat. No. 4731389 taught the use of 1,3 butylene glycol and Indopol™ L-14. As shown in Example 22, the use of 1,3 butylene glycol did not work well in providing a stable foam. In this example, the present inventors explored drying shrinkage properties using a standard mortar mixture and compared this with samples having Indopol™ L-14 or, as used in the present invention, hexylene glycol.

Table 19 summarizes mixture proportions of the samples.

TABLE 19

| Standard Mortar Mix | Control | Hexylene Glycol | 1,3-butylene glycol | 1,3-butylene glycol |
|---|---|---|---|---|
| Type I cement | 22.22% | 22.22% | 22.22% | 22.22% |
| Sand | 66.67% | 66.67% | 66.67% | 66.67% |
| Water | 11.11% | 10.67% | 10.67% | 10.67% |
| Hexylene Glycol | | 0.44% | | |
| 1,3-butylene glycol | | | 0.44% | |
| Indopol ™ L-14 | | | | 0.44% |
| W/C (water/cement) | 0.50 | 0.50 | 0.50 | 0.50 |
| Air content % | 4.60% | 5.80% | 5.20% | 4.20% |
| Unit Weight g/cm$^3$ | 2.20 | 2.17 | 2.19 | 2.21 |

Figure 12:
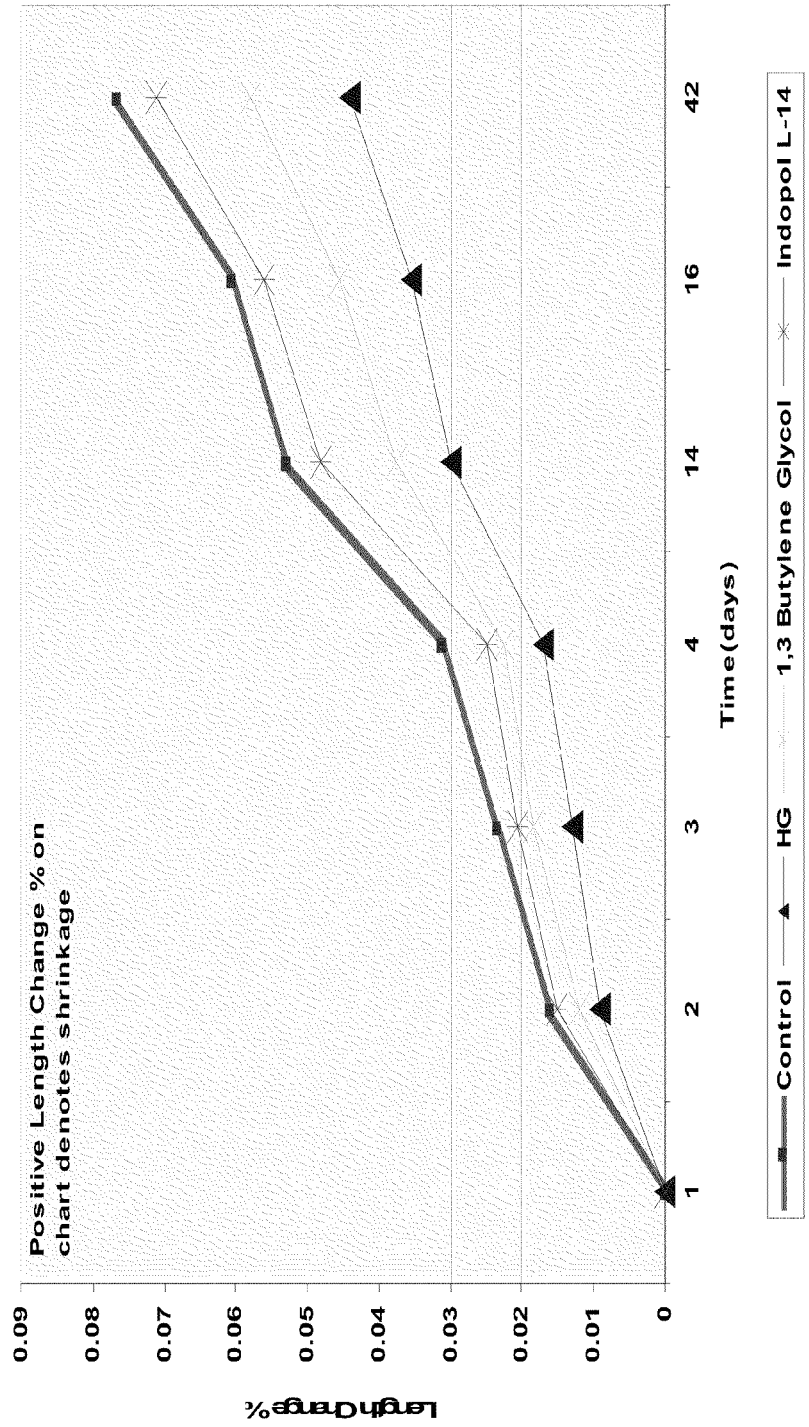
FIG. 12 is a graph plot, in terms of time (horizontal axis) against shrinkage measured in terms of length-wise shrinkage (vertical axis) of a cement samples containing various glycols, including hexylene glycol (HG), one of the preferred SRAs in the present invention, and also including (PRIOR ART) glycols including 1,3 butylene glycol, and INDOPOL™ L-14, compared to a control sample.

The drying shrinkage results are illustrated in FIG. 12, which graphically illustrates in terms of time (along horizontal axis) against length-wise shrinkage of a control cement sample, a cement sample containing hexylene glycol (HG), and two cement samples containing 1,3 butylene glycol and INDOPOL™ L-14.

It was observed that there was essentially no benefit for shrinkage reduction with INDOPOL™ L-14; and the 1,3 butylene glycol is not as effective as hexylene glycol. As mentioned previously, good shrinkage reduction is needed to have dimensionally stable foam. The present inventors believe that a shrinkage reducing admixture is needed which does not act as a strong defoamer. Thus, the two materials mentioned in U.S. Pat. No. 4731389 are not suitable for Portland cement based foams as produced with this invention.

EXAMPLE 24

Additional experiments were conducted to determine if polyvinyl acetate (PVA) would work as well as polyvinyl alcohol (PVOH) in stabilizing the foam component, and to determine the preferred degree of hydrolysis (PVOH). The PVOH used is commercially available from Celanese under the trade name CELVOL™. The PVA materials were sourced from Nippon and Airvol. Cementitious foam slurries were made according to the formulations described in Table 20A, and viscosity and hydrolysis properties are described in Table 20B.

TABLE 20A

| | P54 Celvol 523 PVOH | P55 Nippon z-200 PVA | P56 Nippon GM-14R PVA | P57 Nippon T330-H PVA | P58 Airvol PVOH |
|---|---|---|---|---|---|
| Foaming Component | 42.3% | 42.3% | 42.3% | 42.3% | 42.3% |
| PVOH (T/S in 5% solution) | 1.90% | | | | 1.90% |
| PVA (T/S in 5% solution) | | 1.90% | 1.90% | 1.90% | |
| PC Surfactant (TAMOL ™ 731 DP) | 0.30% | 0.30% | 0.30% | 0.30% | 0.30% |
| SRA (HG) | 0.46% | 0.46% | 0.46% | 0.46% | 0.46% |
| Calcium Nitrite (DCI) | 2.28% | 2.28% | 2.28% | 2.28% | 2.28% |

TABLE 20A-continued

|  | P54 Celvol 523 PVOH | P55 Nippon z-200 PVA | P56 Nippon GM-14R PVA | P57 Nippon T330-H PVA | P58 Airvol PVOH |
|---|---|---|---|---|---|
| VMA (Methyl Cellulose) | 0.02% | 0.02% | 0.02% | 0.02% | 0.02% |
| Microfibers 1.5 mm PE | 0.07% | 0.07% | 0.07% | 0.07% | 0.07% |
| Microfibers 0.8 mm PE | 0.05% | 0.05% | 0.05% | 0.05% | 0.05% |
| Monterey Limestone | 1.14% | 1.14% | 1.14% | 1.14% | 1.14% |
| Water | 36.11% | 36.11% | 36.11% | 36.11% | 36.11% |
| Cement Paste Component | 57.7% | 57.7% | 57.7% | 57.7% | 57.7% |
| Barium Metaborate | 0.34% | 0.34% | 0.34% | 0.34% | 0.34% |
| PC Surfactant (TAMOL ™ 731 DP) | 0.30% | 0.30% | 0.30% | 0.30% | 0.30% |
| SRA (HG) | 0.53% | 0.53% | 0.53% | 0.53% | 0.53% |
| Microfibers 8 mm PP | 0.61% | 0.61% | 0.61% | 0.61% | 0.61% |
| Water | 15.97% | 15.97% | 15.97% | 15.97% | 15.97% |
| White Cement | 30.41% | 30.41% | 30.41% | 30.41% | 30.41% |
| Denka CSA | 9.50% | 9.50% | 9.50% | 9.50% | 9.50% |
| Cement Paste-to-Foam Component by Mass | 1.36 | 1.36 | 1.36 | 1.36 | 1.36 |
| Total W/C (water/cement) | 1.31 | 1.31 | 1.31 | 1.31 | 1.31 |
| Initial Wet Density (g/cm$^3$) | 0.245 | 0.604 | 0.269 | 0.945 | 0.263 |
| Final Dry Density (g/cm$^3$) | 0.123 | 0.502 | 0.135 | 0.790 | 0.136 |
| Measured K-Value (W/m°K) | 0.032 | 0.047 | 0.036 | 0.055 | 0.035 |

TABLE 20B

|  | Viscosity (mPA * s) | Hydrolysis Degree (% mol) |
|---|---|---|
| P54-Celvol ™ 523 PVOH | 23-27 | 87-89 |
| P55-Nippon ™ z-200 PVA | 13.2 | 99.1 |
| P56-Nippon ™ GM-14R PVA | 20 | 86.5-89 |
| P57-Nippon ™ T330-H PVA | 30.2 | 99.3 |
| P58-Airvol ™ PVOH | 9.1 | 87-89 |

The results show that similar densities can be obtained using either PVA or PVOH and that hydrolysis levels below 95% provide cementitious foams having more air content. The present inventors therefore determined that using PVA or PVOH at 99% hydrolysis was not economical due to lower yield.

The PVA specimens had a smoother more plastic like surface and thus seemed to be more attractive from an aesthetic perspective.

EXAMPLE 25

Examples up to now achieved higher densities useful for structural or some fireproofing applications by increasing the ratio of cement to foam. A more economical means of doing this would be to add an inexpensive cement based filler. One kind of filler could be derived from hydrated cement, of which one source is the filter cake left over from aggregate recovery. Another filler that is believed suitable is crushed concrete. Both of these options would recycle materials that are typically put into land fills.

In Table 21, the density of the insulating cementitious foam using these materials can be increased.

TABLE 21

|  | P59 Crushed Hydrated Cement Aggregate | P60 Crushed 28-day Concrete Aggregate |
|---|---|---|
| Foaming Component | 21.81% | 23.08% |
| PVOH 540S | 1.89% | 1.85% |

TABLE 21-continued

|  | P59 Crushed Hydrated Cement Aggregate | P60 Crushed 28-day Concrete Aggregate |
|---|---|---|
| PC Surfactant (TAMOL ™ 731 DP) | 0.47% | 0.46% |
| 3:1 SRA (HG):Fatty Acids | 0.42% | 0.42% |
| Calcium Nitrite (DCI) | 3.15% | 3.09% |
| VMA (Methyl Cellulose) | 0.04% | 0.04% |
| Microfibers 1.5 mm PE | 0.08% | 0.08% |
| Microfibers 0.8 mm PE | 0.04% | 0.04% |
| Monterey Limestone | 1.17% | 1.15% |
| Water | 14.55% | 15.95% |
| Cement Paste Component | 78.19% | 76.90% |
| Barium Metaborate | 0.31% | 0.31% |
| PC Surfactant (TAMOL ™ 731 DP) | 0.31% | 0.31% |
| SRA (HG) | 0.71% | 0.69% |
| Microfibers 8 mm PP | 0.78% | 0.76% |
| Water | 14.94% | 14.69% |
| Grey Cement | 29.47% | 28.98% |
| Denka CSA (expansion agent) | 9.82% | 9.66% |
| Crushed Hydrated Cement | 21.86% |  |
| Crushed Concrete |  | 21.50% |
| Cement Paste-to-Foam Component by Mass | 3.585 | 3.332 |
| Final W/C (water/cement) | 0.500 | 0.530 |
| Final Dry Density (g/cm$^3$) | 0.87 | 0.38 |
| Wet Density before Aggregate Addition (g/cm$^3$) | 0.73 | 0.33 |
| Wet Density after Aggregate Addition (g/cm$^3$) | 1.13 | 0.49 |
| Measured K-Value (W/m ° K) | 0.143 | 0.047 |
| Strength (MPa) | 6.95 | 0.75 |

EXAMPLE 26

Table 22A summarizes three mix design samples for making cementitious foam having dry density of 0.5 g/cm3. One foam sample is made without fibers, a second foam sample is made with microfibers less than 5 mm long, and a third foam sample is made with macro-sized fibers (commercially available from Grace Construction Products under the brand name STRUX® 90/40) having length of 40 mm, added in addition to the microfibers.

TABLE 22A

| Flexural Strength Board Designs | P61 | P62 (with macrofibers) | P63 (without macrofibers) |
|---|---|---|---|
| Foaming Component | 27.84% | 27.77% | 28.39% |
| PVOH 540S | 2.40% | 2.39% | 2.46% |
| PC Surfactant (TAMOL ™ 731 DP) | 0.60% | 0.60% | 0.61% |
| VMA (Methyl Cellulose) | 0.06% | 0.06% | 0.06% |
| Monterey Limestone | 1.50% | 1.49% | 1.54% |
| SRA (HG)/Fatty Acids | 0.60% | 0.60% | 0.62% |
| SRA (HG) | 0.00% | 0.00% | 0.00% |
| Calcium Nitrite (DCI) | 4.02% | 4.01% | 4.12% |
| Microfibers 1.5 mm PE | 0.11% | 0.11% | |
| Microfibers 0.8 mm PE | 0.06% | 0.06% | |
| Water | 18.50% | 18.45% | 18.98% |
| Cement Slurry Component | 71.79% | 72.23% | 71.61% |
| SRA (HG_coated on PP 5 mm PP fibers | 1.00% | 1.00% | |
| Microfibers 5 mm PP | 1.00% | 1.00% | |
| White Cement | 37.50% | 37.41% | 38.47% |
| Denka CSA (expansion agent) | 12.50% | 12.47% | 12.82% |
| Barium Metaborate | 0.40% | 0.40% | 0.41% |
| PC Surfactant (TAMOL ™ 731 DP) | 0.40% | 0.40% | 0.41% |
| Macrofibers (STRUX ® 85/50) | | 0.61% | |
| Water | 19.00% | 18.95% | 19.49% |
| Total W/C (water/cement) | 0.79 | 0.79 | 0.79 |
| Final Dry Density (g/cm³) | 0.511 | 0.497 | 0.501 |
| Ultimate stress at 10% compression (MPa) | 2.280 | 2.240 | 2.077 |
| Strength-to-density Ratio (metric) | 4.46 | 4.51 | 4.15 |

Figure 13:
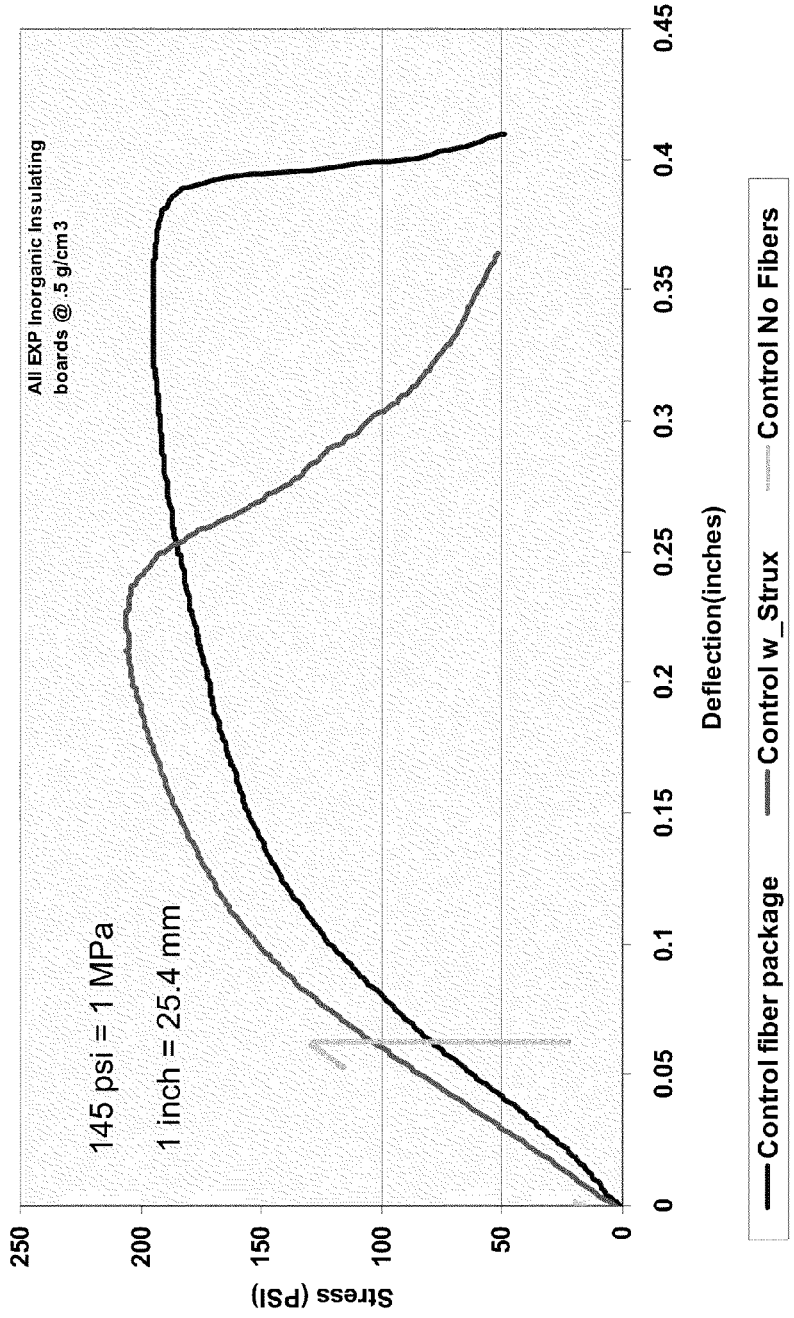
FIG. 13 is graph plot of deflection (horizontal axis) against stress (vertical axis) of cement samples containing fibers compared to control sample.

FIG. 13 graphically illustrates toughness performance of cementitious foam specimens that are 14 inches long, 4 inches wide by 1 inch thick, tested under third-point loading with the test length of 12 inches. The graph is a plot of deflection (horizontal axis) against stress (vertical axis) of cement samples containing fibers compared to control sample. The results show that there is a significant increase in ductility with the addition of the fibers with strain hardening and elastic-plastic behavior. The use of macrofibers significantly increased the peak load and stiffness of the cementitious foam sample. The specimen without fibers broke into two pieces after peak load was reached and was much more brittle, but the strain to failure was about 0.5%, which is higher than the typical 0.06% for ordinary concrete, indicating that the PVOH might provide some benefits. The improved performance of the sample with fibers is well beyond that of normal concrete. Addition of polypropylene and polyethylene fibers renders the material less brittle.

EXAMPLE 27

The addition of a polypropylene mesh significantly improves the performance of cementitious foam materials made in accordance with the present invention.

Data is provided in Table 22B. Several boards 1 inch thick were produced with mesh or membrane combinations as mentioned in Example 7 with additional combinations as further described in the present example.

Macrofibers used were commercially available from Grace Construction Products under the trade name STRUX®.

Mechanically fastened and/or fully adhered waterproofing membranes and roofing underlayments are commercially available from Grace Construction Products under the trade names TRIFLEX® EXTREME™ and ICE & WATER SHIELD@. Both are believed to be suitable for use in the present invention.

TABLE 22B

| Mix Design | Samples Made with Membrane Combinations Constant Fiber Loading | 3 samples per combination tested on Tinius Olsen Macrofibers | Waterproofing Membranes | 100 squares per in² mesh |
|---|---|---|---|---|
| P62 | Fibers: 0.8 mm PE, 1.8 mm PE, 5 mm PP | Strux ® 85/50 (Grace PP) | | |
| P62 | Same as above | Strux ® 85/50 (Grace PP) | Triflex ® Extreme (Grace) | |
| P62 | Same as above | Strux ® 85/50 (Grace PP) | Ice & Water Shield ® (Grace) | |
| P62 | Same as above | Strux ® 85/50 (Grace PP) | | Mesh |
| P62 | Same as above | Strux ® 85/50 (Grace PP) | Triflex ® Extreme (Grace) | Mesh |
| P62 | Same as above | Strux ® 85/50 (Grace PP) | Ice & Water Shield ® (Grace) | Mesh |
| P61 | Same as above | | | |
| P61 | Same as above | | Triflex ® Extreme (Grace) | |
| P61 | Same as above | | Ice & Water Shield(Grace) | |
| P61 | Same as above | | | Mesh |
| P61 | Same as above | | Triflex ® Extreme (Grace) | Mesh |
| P61 | Same as above | | Ice & Water Shield(Grace) | Mesh |
| P61 | Same as above | | | Mesh on both sides |

Figure 14:
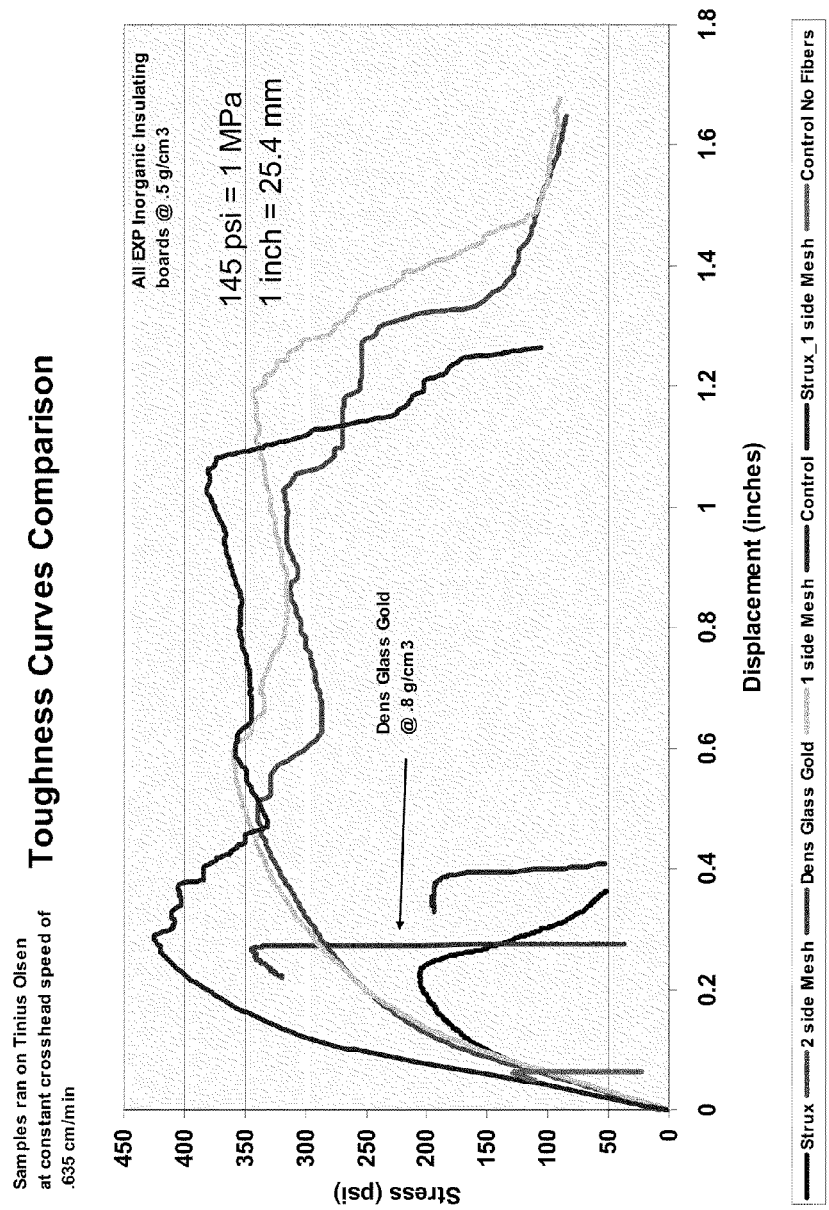
FIG. 14 is a graph plot of displacement (horizontal axis) against stress (vertical axis) of a commercially available gypsum wall board (Dens Glass Gold) compared to cementitious foam compositions of the present invention which incorporated macrofibers (STRUX®) or mesh.

FIG. 14 graphically illustrates the toughness performance of the fiber samples with and without mesh, compared to a conventional (PRIOR ART) ⅝-inch thick gypsum board sold under the trade name Dens Glass Gold® at 0.8 g/cm3. The toughness test was run on Tinius Olsen equipment at constant crosshead speed of 0.635 cm/minute. The results from this stress/displacement testing show that there is a significant increase in stress-resistance when a mesh is used and that elongation is significantly improved compared to the thinner gypsum board (Dens Glass Gold) which would have had even less ductility if it were thicker. Thus, 1-inch thick boards made with the cementitious foam material of the present invention can be substituted for Dens Glass Gold® board at ⅝-inch, giving about a 3 fold increase in R value, an increase in ductility by a factor greater than 4, higher flexural strength and toughness, all at the same weight.

As shown in FIG. 10, cementitious foam structures made in accordance with the present invention have better resistance to cracking and spalling caused by fasteners.

EXAMPLE 28

The relative amount of each component of exemplary foaming and cementitious slurry systems will depend on a number of factors, including the desired final density, and also on the mixing equipment. For example, for three cementitious foams having different final densities will require adjustments to the individual components, as illustrated in the Table 23, which shows three different sets of foaming/slurry systems. The foam and slurries were made separately by mechanical mixing, and then combined together to form a cementitious foam.

TABLE 23

| | Final Densities (g/cm³) | | |
|---|---|---|---|
| | 0.481 | 0.383 | 0.192 |
| Foaming System | % of Foam Sol | | |
| PC Surfactant (TAMOL ™ 731 DP) | 1.20% | 1.12% | 0.99% |
| Foam Stabilizer (PVOH) | 6.70% | 6.21% | 5.48% |
| SRA (HG) | 2.15% | 1.99% | 1.75% |
| Calcium Salt (nitrite) | 2.73% | 2.53% | 2.24% |
| VMA | 0.12% | 0.11% | 0.08% |
| Microfibers 1.5 mm PE | 0.24% | 0.22% | 0.21% |
| Microfibers .8 mm PE | 0.14% | 0.13% | 0.13% |
| Fine Particles | 4.29% | 3.98% | 3.51% |
| Water | 82.44% | 83.71% | 85.61% |
| Cementitious Slurry System | % of Slurry | | |
| Barium Metaborate | 0.63% | 0.63% | 0.63% |
| PC Surfactant (TAMOL ™ 731 DP) | 0.69 | 0.68% | 0.68% |
| SRA (HG used to coat fibers) | 1.68% | 1.69% | 1.69% |
| Microfibers 8 mm PP | 1.68% | 1.69% | 1.69% |
| Water | 26.25% | 26.25% | 26.26% |
| Cement | 51.80% | 51.80% | 51.78% |
| Expansive Agent | 17.26% | 17.27% | 17.27% |
| Cement Slurry Component addition by mass to Foam to hit Censity | 1.36 | 1.25 | 1.11 |
| Foaming System | % TS of Foam Solution | | |
| PC Surfactant (TAMOL ™ 731 DP) | 6.85% | 6.85% | 6.90% |
| Foam Stabilizer (PVOH) | 38.14% | 38.14% | 38.05% |
| SRA (HG) | 12.22% | 12.22% | 12.19% |
| Calcium Salt (nitrite) | 15.53% | 15.53% | 15.53% |
| VMA | 0.67% | 0.67% | 0.59% |
| Microfibers 1.5 mm PE | 1.34% | 1.34% | 1.47% |
| Microfibers .8 mm PE | 0.81% | 0.81% | 0.88% |
| Fine Particles | 24.44% | 24.44% | 24.39% |
| Part Water To add to Foam Package | 4.696 | 5.139 | 5.948 |
| Cement Slurry Component | % TS of Cement Slurry | | |
| Barium Metaborate | 0.85% | 0.85% | 0.85% |
| PC Surfactant (TAMOL ™ 731 DP) | 0.94% | 0.93% | 0.93% |
| HG (coated on Microfibers) | 2.28% | 2.29% | 2.29% |
| Microfibers 8 mm PP | 2.28% | 2.29% | 2.29% |
| Cement | 70.24% | 70.23% | 70.23% |
| Expansive | 23.40% | 23.41% | 23.42% |
| Part Water To add to Cement Slurry Package | 0.356 | 0.356 | 0.356 |

When a static mixer is used, the final density of the cementitious foam will primarily depend on the equipment settings. Thus, percentage amounts of the various components can vary significantly. Exemplary foam and slurry systems for static mixing are provided in Tables 24 and 25 below:

TABLE 24

| % of Foam Sol | |
|---|---|
| PC Surfactant (TAMOL ™ 731 DP) | 1.41% |
| Foam Stabilizer (PVOH) | 4.93% |
| SRA (HG) | 1.24% |
| Water | 92.42% |
| % of Cementitious Slurry | |
| VMA (Methyl Cellulose) | 0.04% |
| SRA (HG)/Fatty Acids | 0.00% |
| SRA | 0.43% |
| Calcium Salt (nitrite) | 2.80% |
| PC Surfactant (TAMOL ™ 731 DP) | 0.43% |
| Microfibers 1.5 mm PE | 0.22% |
| Microfibers .8 mm PE | 0.13% |
| Microfibers 5 mm PP | 0.65% |
| White Cement | 59.17% |
| Expansion agent (Denka CSA) | 10.76% |
| Barium Metaborate | 0.86% |
| Water | 24.53% |

TABLE 25

| % TS of Foam Solution Package | |
|---|---|
| PC Surfactant (TAMOL ™ 731 DP) | 18.60% |
| Foam Stabilizer (PVOH) | 65.02% |
| SRA (HG) | 16.38% |
| % TS of Cementitious Slurry Package | |
| VMA (Methyl Cellulose) | 0.06% |
| SRA (HG)/Fatty Acids | 0.00% |
| SRA (HG) | 0.57% |
| Calcium Salt (nitrite) | 3.71% |
| PC Surfactant (TAMOL ™ 731 DP) | 0.57% |
| Microfibers 1.5 mm PE | 0.29% |
| Microfibers .8 mm PE | 0.17% |
| Fibers 5 mm PP | 0.86% |
| White Cement | 78.39% |
| Expansion Agent (Denka CSA) | 14.25% |
| Barium Metaborate | 1.14% |

EXAMPLE 29

Foam was produced using a static mixer, and then pumped into concrete to produce a lightweight concrete. The concrete used was a high performance mixture having good strength after more than 25% air is added through inclusion of the foam. Table 26 summarizes details of the mix and various hardened properties. The k value of 0.1778 W/(m° K.) is over 3 times lower than that obtained from a typical lightweight concrete at a similar density, and similar to that of standard commercial cementitious materials at half the density and lower strength. The present inventors believe that lower foam additions would result in a concrete with air content similar to that of air entrained concrete (typically 4.5-8%) in a more controllable process than adding an air entraining admixture.

TABLE 26

| | P64 Lightweight foam injected concrete |
|---|---|
| Foam Components | % Foam Mass |
| PC Surfactant (TAMOL ™ 731 DP) | 1.54 |
| Foam Stabilizer (PVOH) | 5.38 |
| SRA (HG) | 1.36 |
| Water | 91.7 |
| Air content in foam | 86% |
| Volume Foam Added | 14.3 L |
| Concrete Mix Before Foam | kg/m³ (Based on 1 cu meter of material) |
| Cement | 439 |
| Densified Silica Fume (Force 10,000) | 36 |
| 6-13 mm Aggregate | 1025 |
| Sand | 891 |
| Water | 143 |
| Superplasticizer | 0.19 |

TABLE 26-continued

| | P64 Lightweight foam injected concrete | |
|---|---|---|
| SRA (HG) | 0.44 | |
| Initial Unit Weight | 2460 | (kg/m³) |
| Volume Concrete Produced | 28.31 | L |
| Wet Unit Weight after Foam added | 1538 | (kg/m³) |
| Dry Unit Weight of foamed concrete | 1500 | (kg/m³) |
| Percent Air in Concrete (airpot) | 31% | |
| 1-day compressive strength (MPa) | 2.18 | |
| 7-day compressive strength (MPa) | 6.96 | |
| K-Value (W/m·°K) | 0.1775 | |

The foregoing example and embodiments were present for illustrative purposes only and not intended to limit the scope of the invention.

We claim:

1. An article made from a cementitious foam slurry comprising:
   (i) a polycarboxylate surfactant in an amount effective for generating cementitious foam;
   (ii) a foam stabilizer comprising a polyvinyl alcohol, polyvinyl acetate, or mixture thereof, said foam stabilizer in an amount effective to stabilize the foam;
   (iii) a shrinkage reducing admixture in an amount effective to reduce plastic shrinkage in the cementitious slurry after water is introduced to initiate hydration of cement in the cementitious foam slurry;
   (iv) a calcium salt in an amount effective to accelerate setting of cement in the cementitious foam slurry when water is added to initiate hydration, said calcium salt comprising calcium nitrite, calcium nitrate, or mixture thereof;
   (v) a viscosity modifying agent;
   (vi) a binder comprising Portland cement in an amount effective to provide cementitious foam slurry when the cement is combined with water;
   (vii) an expansion agent in an amount effective for expanding by chemical reaction the volume of the cementitious slurry, said expansion agent comprising calcium oxide, magnesium oxide, calcium sulfoaluminate, or mixture thereof;
   (viii) a cross-linking agent in an amount effective for cross-linking said foam stabilizer, said foam stabilizer cross-linking agent comprising a borate, a sulfate, an aluminate, or a mixture thereof; and
   (ix) a plurality of microfibers in an amount effective to reduce plastic shrinkage cracking of said Portland cement when mixed with water in an amount effective to initiate hydration of the cement, said microfibers having an effective diameter of 5-50 microns and being comprised of cellulose, synthetic polymer, or mixture thereof;
   said components (i) through (ix) being combined with water in amount effective to form a cementitious foam slurry, to initiate hydration of said cement binder within the cementitious foam slurry, and to incorporate said components into a foamed cement article upon hardening of the cementitious foam slurry.

2. The article of claim 1 wherein said article is provided by combining said components (i)-(iii) with water to provide a foaming component; combining component (vi) with water to provide a cementitious slurry; and combining said foaming and cementitious slurry components to provide the cementitious foam slurry.

3. The article of claim 1 wherein said cementitous foam made by combining said components (i)-(v) with water to provide a foaming component;
   combining said components (vi)-(viii) with water to provide a cementitious slurry; and
   combining said foaming and cementitous slurry components to form the cementitous foam slurry.

4. The article of claim 1 wherein said cementitious foam slurry is shaped.

5. The article of claim 1 further comprising lightweight aggregate selected from the group consisting of vermiculite, expanded polystyrene, perlite, and mixtures thereof.

6. The article of claim 1 being molded or shaped into a panel or board.

7. The article of claim 1 attached, adhered, or disposed against a coating or pre-formed layer.

8. The article of claim 7 wherein said article is a laminate comprising a waterproofing membrane.

9. The article of claim 1 wherein said article is shaped into a block or brick.

10. The article of claim 1 having a specific gravity under 0.1 g/cm³ and insulation (k) value under 0.045 W/(m°K).

11. The article of claim 1 having a specific gravity between 0.1-0.35 g/cm³ and an insulation (k) value under 0.05 W/(m°K).

12. The article of claim 1 having a specific gravity between 0.35-0.45 g/cm³ and an insulation (k) value under 0.05 W/(m°K).

13. The article of claim 1 having a specific gravity between 0.45-0.7 g/cm³ and an insulation (k) value under 0.08 W/(m°K).

14. The article of claim 1 having a specific gravity between 0.7-1.0 g/cm³ and an insulation (k) value under 0.1 W/(m°K).

15. The article of claim 1 formed from components provided from combining water with a unitary mixture of said components providing said cementitious foam slurry.

16. The article of claim 1 further comprising sand, crushed gravel, or mixture thereof.

17. An article made from a cementitious foam slurry comprising mixing water and a composition comprising:
   (i) a polycarboxylate surfactant in an amount effective for generating cementitious foam;
   (ii) a foam stabilizer comprising a polyvinyl alcohol, polyvinyl acetate, or mixture thereof, said foam stabilizer in an amount effective to stabilize the foam;
   (iii) a shrinkage reducing admixture in an amount effective to reduce plastic shrinkage in the cementitious slurry after water is introduced to initiate hydration of the cement, said shrinkage reducing admixture comprising an alkylene glycol, diol, or mixture thereof, but not including butyl ether;
   (iv) calcium nitrite, calcium nitrate, or mixture thereof, in an amount effective to accelerate setting of cement in the cementitious foam slurry when water is added to initiate hydration;
   (v) a viscosity modifying agent;
   (vi) a binder comprising Portland cement in an amount effective to provide the cementitious foam slurry when combined with water;
   (vii) an expansion agent in an amount effective for expanding by chemical reaction the volume of the cementitious slurry, said expansion agent comprising calcium oxide, magnesium oxide, calcium sulfoaluminate, or mixture thereof;
   (viii) a cross-linking agent in an amount effective for cross-linking said foam stabilizer, said foam stabilizer cross-linking agent comprising a borate, a sulfate, an aluminate, or a mixture thereof; and (ix) a plurality of microfibers in an amount effective to reduce plastic shrinkage cracking of said Portland cement when mixed with water in an amount effective to initiate hydration of the cement, said microfibers comprising a polyolefin, a polyolefin derivative, a polyester, or mixture thereof, and having an average length of 1-30 mm, a mean transverse dimension of 5-30μm, and an aspect ratio of 100-1000;

said components (i) through (ix) being combined with water in amount effective to form a cementitious foam slurry, to initiate hydration of said cement binder within the cementitious foam slurry, and to incorporate said components into a foamed cement article upon hardening of the cementitious foam slurry.

18. The article of claim 17 further comprising macrofibers.

19. The article of claim 17 further comprising a mesh.

* * * * *